(12) United States Patent
Ellsworth

(10) Patent No.: US 8,740,229 B2
(45) Date of Patent: Jun. 3, 2014

(54) SLOPE TRAVERSING SYSTEM FOR ZERO TURNING RADIUS VEHICLES

(76) Inventor: William D. Ellsworth, Macedon, NY (US)

(*) Notice: Subject to any disclaimer, the term of this patent is extended or adjusted under 35 U.S.C. 154(b) by 0 days.

(21) Appl. No.: 13/429,500

(22) Filed: Mar. 26, 2012

(65) Prior Publication Data

US 2013/0025957 A1   Jan. 31, 2013

Related U.S. Application Data

(60) Provisional application No. 61/511,727, filed on Jul. 26, 2011, provisional application No. 61/587,223, filed on Jan. 17, 2012.

(51) Int. Cl.
*B60B 33/00* (2006.01)
*B60B 33/04* (2006.01)

(52) U.S. Cl.
USPC ...... 280/86; 280/86.1; 280/5.508; 280/6.154; 180/282; 56/14.7

(58) Field of Classification Search
USPC ........... 280/89–89.13, 90, 93.51, 93.502, 86, 280/86.1, 5.508, 6.154; 180/6.24, 6.3, 180/65.51, 402, 403; 56/14.7, 16.7
See application file for complete search history.

(56) References Cited

U.S. PATENT DOCUMENTS

| | | | |
|---|---|---|---|
| 4,504,074 A | 3/1985 | Smith | |
| 4,901,758 A | 2/1990 | Cook et al. | |
| 4,912,662 A * | 3/1990 | Butler et al. | 702/154 |
| 4,914,592 A | 4/1990 | Callahan et al. | |
| 5,221,100 A * | 6/1993 | McNutt | 280/78 |
| 6,962,219 B2 | 11/2005 | Hauser | |
| 6,983,583 B2 * | 1/2006 | Bucher | 56/10.2 R |
| 7,017,327 B2 * | 3/2006 | Hunt et al. | 56/14.7 |
| 7,076,348 B2 * | 7/2006 | Bucher et al. | 701/29.4 |
| 7,231,825 B2 * | 6/2007 | Davidson | 73/510 |
| 7,237,629 B1 | 7/2007 | Bland et al. | |
| 7,430,847 B2 | 10/2008 | Hoffman et al. | |
| 7,686,107 B1 | 3/2010 | Bland et al. | |
| 7,735,845 B2 | 6/2010 | Snow | |
| 8,011,678 B1 | 9/2011 | Bell et al. | |
| 2006/0010643 A1 * | 1/2006 | Hornbach et al. | 16/19 |
| 2006/0175098 A1 | 8/2006 | Sutherland | |
| 2008/0209673 A1 * | 9/2008 | Cooper et al. | 16/45 |
| 2009/0000839 A1 * | 1/2009 | Ishii et al. | 180/65.5 |
| 2009/0020351 A1 * | 1/2009 | Chun et al. | 180/209 |
| 2009/0152828 A1 * | 6/2009 | Bebernes et al. | 280/86 |
| 2009/0308040 A1 * | 12/2009 | Cheek et al. | 56/17.2 |
| 2010/0191408 A1 * | 7/2010 | Boylston et al. | 701/29 |
| 2010/0307843 A1 * | 12/2010 | Lawson, Jr. | 180/6.48 |
| 2011/0162166 A1 * | 7/2011 | Cooper et al. | 16/45 |

FOREIGN PATENT DOCUMENTS

JP  2000160526 A  *  6/2000
JP  2003034917 A  *  2/2003

* cited by examiner

*Primary Examiner* — Paul N Dickson
*Assistant Examiner* — Darlene P Condra
(74) *Attorney, Agent, or Firm* — Duane C. Basch; Basch & Nickerson LLP

(57) ABSTRACT

A zero turning radius vehicle is disclosed having a power transmission operatively and independently engaged to each one of at least two driven wheels, and including at least one caster, supporting a portion of said vehicle weight, rotatably connected to the vehicle whereby the caster is operatively biased while the vehicle is operating at a side angle such that the caster neutralizes the gravitational force that would tend to drive the vehicle downward when traversing a slope.

25 Claims, 25 Drawing Sheets

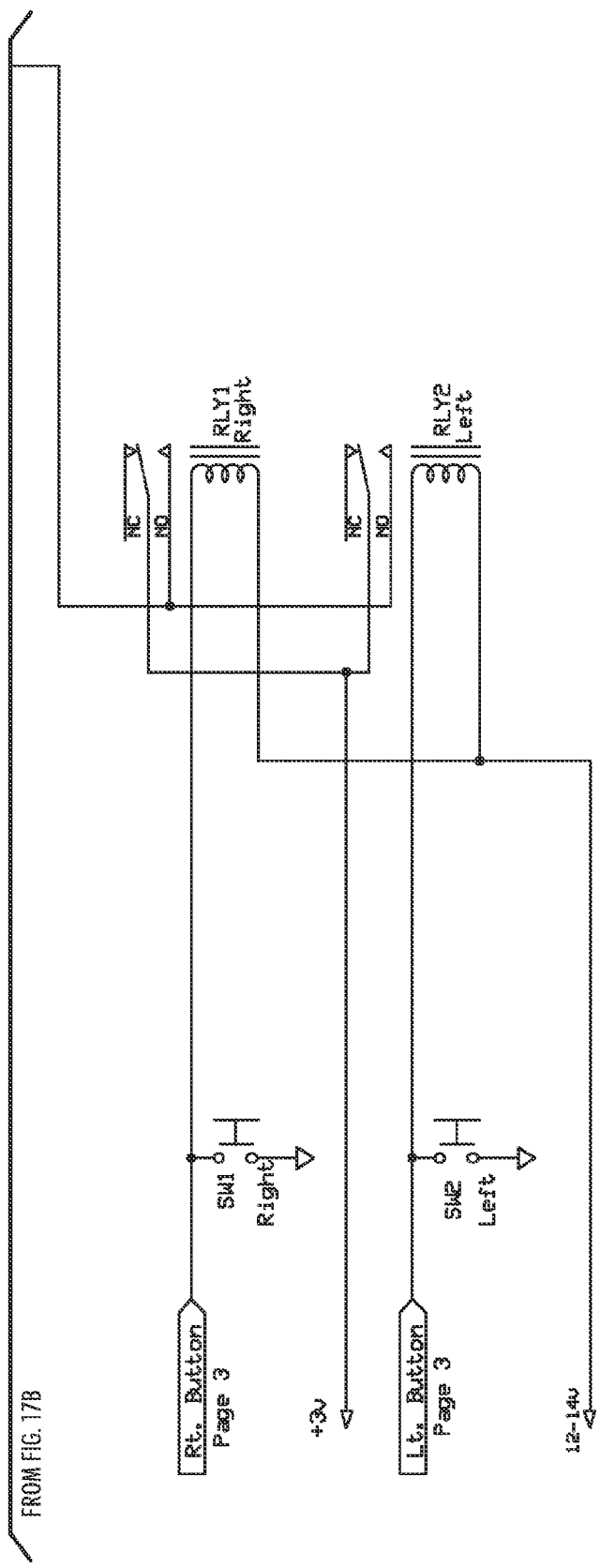

SLOPE TRAVERSING SYSTEM FOR ZERO TURNING RADIUS VEHICLES

This application claims priority from the following provisional applications under 35 U.S.C. §119: U.S. Application No. 61/511,727 for a "SAFE SLOPE SYSTEM FOR ZERO TURNING RADIUS MOWERS," by W. Ellsworth, filed Jul. 26, 2011; and U.S. Application No. 61/587,223 for a "SLOPE TRAVERSING SYSTEM FOR ZERO TURNING RADIUS VEHICLES," by W. Ellsworth, filed Jan. 17, 2012, both of which are hereby incorporated by reference in their entirety. An improvement to zero turning radius vehicles is disclosed that provides a compensation system for balancing the rotational force applied to the forward caster wheels as a result of gravity pulling the front of the vehicle down hill when traversing an inclined surface. The system described herein is termed the Slope Traversing System.

BACKGROUND AND SUMMARY

It is well known in the art of turf maintenance to use a grass cutting vehicle having the ability to turn within itself, commonly referred to as a zero turning radius (ZTR) lawn mower. A ZTR mower, such as a Ferris Model IS 500Z, is generally propelled by independently controlled rear drive wheels, which can be driven at variable radial velocities and directions. The disclosed system is an improvement to ZTR vehicles to allow them to safely traverse slopes. The system applies to any vehicle that utilizes a pair of independently driven wheels to accomplish both the forward and reverse motion as well as the steering along with a front or rear wheel(s) mounted as casters. This type of vehicle is commonly used for commercial and home mowers because of the vehicle's ability to turn quickly, make a turn with zero radius—pivoting on a point along the rear axle, and to reverse direction instantly. All of this saves time in mowing. The following disclosure will focus on four wheel mowers with two front casters and two independently driven rear wheels, but the disclosure should not be construed to apply only to mowers or only to vehicles with two front casters.

Steering of the ZTR is accomplished by driving each one of the independent drive wheels at different rates of speed with respect to the other. In doing so, the driven wheels force the mower to change its direction either to the left or right, thereby providing steering capabilities without any direct control linkage to the forward wheels. Hence, conventional caster wheels are advantageous in that they are responsive to the differential speed of the driven rear wheels and simply provide support for the frame and/or mower deck of the mower. In doing so the mower can be maneuvered in such a way so as to have a center of the turning radius located midway between the driven wheels, therefore a ZTR mower is able to turn about itself.

When traversing a slope, ZTR mowers must use the rear wheels to counteract the tendency of the mower to go down the slope due to gravity. This tendency is called "crabbing" because the mower cannot go straight across the slope, but goes at an angle as the operator continuously corrects the mower's path. When the slope is moderately steep or the traction that the rear wheels can achieve is low (such as in wet conditions or when the turf is soft), the rear wheels will often slide or tear up the turf and the mower will go down the hill regardless of how much steering input the operator uses.

Various mechanical systems have been proposed in order to try to correct this problem. U.S. Pat. No. 4,504,074 to Smith; U.S. Pat. No. 6,962,219 to Hauser, and U.S. Pat. No. 7,686,107 to Bland et al., all address the problem of the rear wheels sliding and the mower going downhill by adding a mechanical steering system to the front wheels. These solutions miss the point. They interfere with the utility of a ZTR mower because they prevent instant changes in direction and prevent instant reversing of the mower. There is no point to having a ZTR mower if it has a steering wheel that has to be rotated to change direction.

ZTR mowers tend to "steer" themselves down hill because the front wheels are mounted as casters well in advance of the rear drive wheels and naturally rotate about their vertical axis as gravity applies a side force to the mower when on a slope. The system disclosed herein counteracts the rotational force that gravity induces in the casters. Thus, just like on flat ground, the casters have a neutral turning force on them; they are in balance. Therefore, the operator can turn uphill or downhill, stop, reverse or make any other maneuver without the rear wheels having to do the extra work of overcoming the side force generated by gravity on the front of the mower. By eliminating this extra work that the rear wheels have to do, sliding and tearing of the turf is eliminated. The disclosed system does not interfere with the natural operation of the ZTR mower, and is "transparent" to the operator, yet allows the mower to operate even on steep slopes as if it were on flat ground. The system also includes a safety feature to help prevent rollovers (something the mechanical systems do not do).

The disclosed system includes, in combination, an electronic subsystem to measure the angle of the mower (side-to-side) and calculate a balancing force necessary to neutralize the effects of gravity on the front of the mower, and a pneumatic subsystem, receiving the output of the electronic subsystem, to deliver a rotational force to the caster(s) without interfering with the ability of the caster(s) to rotate freely.

The electrical subsystem uses a device for measuring the proper acceleration of the vehicle from side to side (i.e., in a direction perpendicular to the front-to-rear axis of the mower). Proper acceleration is the acceleration an object experiences relative to freefall as opposed to relative to a coordinate system. Such a device is generally referred to as an accelerometer or inclinometer (or clinometer), and produces an output that characterizes the angle that the device senses. The accelerometer is located just in front of the rear wheel axles, where it will not be affected by forces produced when the mower is turned sharply. In addition, smoothing of the accelerometer output is provided to minimize the effects of vibration and rough terrain. The electronic system can be analog or digital. In one embodiment, an analog system is disclosed, in an alternative embodiment a digital system is disclosed, which may be preferable as it eliminates the manual tuning that an analog system requires. Nonetheless, the analog embodiment disclosed is representative of a prototype made with an analog controller.

The electrical subsystem carries out a plurality of functions in addition to producing a signal representative of the angle of the mower. First, the electrical subsystem is set to produce an output appropriate for the particular type of mower on which the system is installed. Each type of mower has a different amount of weight on the front caster wheels, and this weight determines the rotational force that gravity induces in the casters. The electrical subsystem is programmed or "tuned" to produce the correct output for any given angle that the mower could be at. Second, in one embodiment the electrical subsystem uses a cam and switch system to cut off the pneumatic control (e.g., air pressure) to a caster when it is rotated more than about 60 degrees away from the caster position when the mower is moving straight forward. This means there is no rotational force or bias applied from the pneumatic system when the casters are sharply rotated, such as when the mower is going backwards or making an extremely sharp turn. As will be described in more detail below, each caster has its own cam/switch control system such that both casters' pneumatic systems will not be turned off if one caster is rotated extremely while the other is not. Third, the electrical subsystem recognizes when the mower is at the maximum angle at which it can be operated safely. A regular ZTR would not usually be able to approach its maximum safe angle of operating because the rear wheels would lose traction before it got near to its rollover point. With systems that improve the ability of the mower to traverse steep slopes, the operator could theoretically take the mower to an unsafe angle of operation, just like he could with a normal tractor type mower. The electrical subsystem is programmed to prevent the operator from approaching the rollover angle. This can be done in several ways. The simplest way is for the system to turn itself off. This results in the casters being allowed to then rotate under the force of gravity, and the mower simply turns down the hill because the casters are no longer biased to enable the mower to hold the steep angle across the face of the slope. The system can turn on an alarm and/or force the drive wheel speed control levers to a neutral position (this requires additions to the pneumatic system or other components of the mower).

In response to the electrical subsystem, the pneumatic subsystem provides the balancing torque to the casters while still allowing them to rotate freely. The pneumatic subsystem consists of a small air compressor, an air reservoir, a pressure switch to control the air compressor, an electro-pneumatic pressure regulator, two double acting air cylinders (one for each caster), a small air reservoir, and an air valve for each port of each air cylinder (e.g., four valves for a normal mower with two front casters each having its own pneumatic cylinder). The electrical subsystem output controls the electro-pneumatic pressure regulator and the air valves based on the angle of the mower. A lever arm is attached to the rotating spindle of each caster (as described in more detail below), and an air cylinder is attached to each lever arm with a rotatable joint so that each caster can rotate freely 360-degrees without interference from the air cylinder. The opposite end of each cylinder is fixed to the frame of the mower or to the front suspension crossbeam if the casters are mounted on a suspended or pivotable axle. When the mower is operated at an angle, the electrical subsystem produces a signal that is output to the electro-pneumatic pressure regulator to produce the correct pressure to balance the torque being induced by gravity on the casters. The weight of the front end of the mower, the length of the lever arm, the diameter of the air cylinders, and the offset of the casters are all factors that impact this pressure. The proper air valves are turned on so that each caster receives a correct balancing or biasing force. The electro-pneumatic pressure regulator is connected both to the air valves and to a small air reservoir having two to three times the volume of the air cylinders on the machine. As the mower traverses a slope, the operator may turn the mower to go around obstacles or follow contours. When this occurs, the casters will naturally change angle, thus changing the volume of air in the air cylinders. The small reservoir is intended to absorb the changes without the electro-pneumatic pressure regulator having to supply more air or vent excess air. This conserves compressed air and makes the system instantly responsive and much more transparent to the operator.

An object of the disclosed embodiments is to provide a neutralizing or balancing force on at least one caster to offset the rotational force induced by gravity when driving the mower across a slope.

It is a further object to ensure that balancing force is transparent to the operator during normal operation of the mower.

It is yet another object of the disclosed embodiments to prevent the accidental rolling over of a mower when cutting on a severe slope by an action including (a) allowing the ZTR mower to naturally turn downhill; (b) provide a warning alarm; and/or (c) reduce the speed or drive power applied to at least one wheel to avoid a rollover.

It is still another object of the disclosed embodiments to provide a biasing force to at least one caster in response to a manual signal.

It is a further objective of the present invention to conserve air pressure with the use of a pneumatic reservoir.

Disclosed in embodiments herein is a zero turning radius vehicle, comprising the improvement of at least one caster supporting a portion of said vehicle weight, and being operatively biased in response to an accelerometer.

The disclosed embodiments relate to a slope sensitized pneumatic system capable of providing a counteracting bias to the caster wheels when traversing an incline, whereby air cylinders, connected to the caster axis, neutralize the gravitational forces.

The disclosed Slope Traversing System does not turn the front casters of the ZTR mower, but merely provides a balancing force to offset the turning force induced in the casters by gravity when the mower is traversing a slope. As a result, the system does not steer the mower and the operator cannot feel any operation differences between operating the mower on flat ground and operating the mower on a slope.

The aforementioned aspects and other objectives and advantages of the disclosed embodiments can be achieved as described in further detail below.

BRIEF DESCRIPTION OF THE DRAWINGS

The accompanying figures, in which like reference numerals refer to similar elements throughout the separate views and which are incorporated in and form a part of the specification, further illustrate the embodiments and, together with the detailed description, serve to explain the embodiments disclosed herein. It is also noted that the drawings may not have been drawn to scale and that certain regions may have been purposely drawn disproportionately so that depicted features and concepts could be properly illustrated. The drawings are for purposes of illustrating various embodiments and are not to be construed as limiting, wherein:

FIGS. 16A-E, 17A-C, 18A-C and 19 are electrical schematics depicting components of the electrical subsystem and analog controller;

DETAILED DESCRIPTION

Figure 1A:
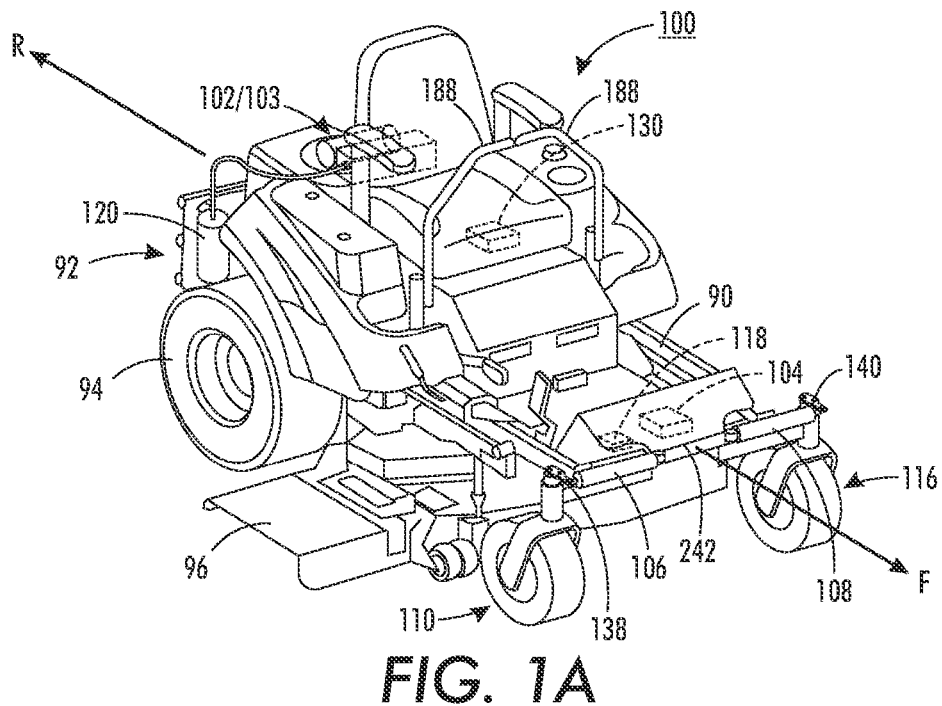
FIGS. 1A and 1B are perspective views of an exemplary ZTR mower incorporating the Slope Traversing System.
Figure 1B:
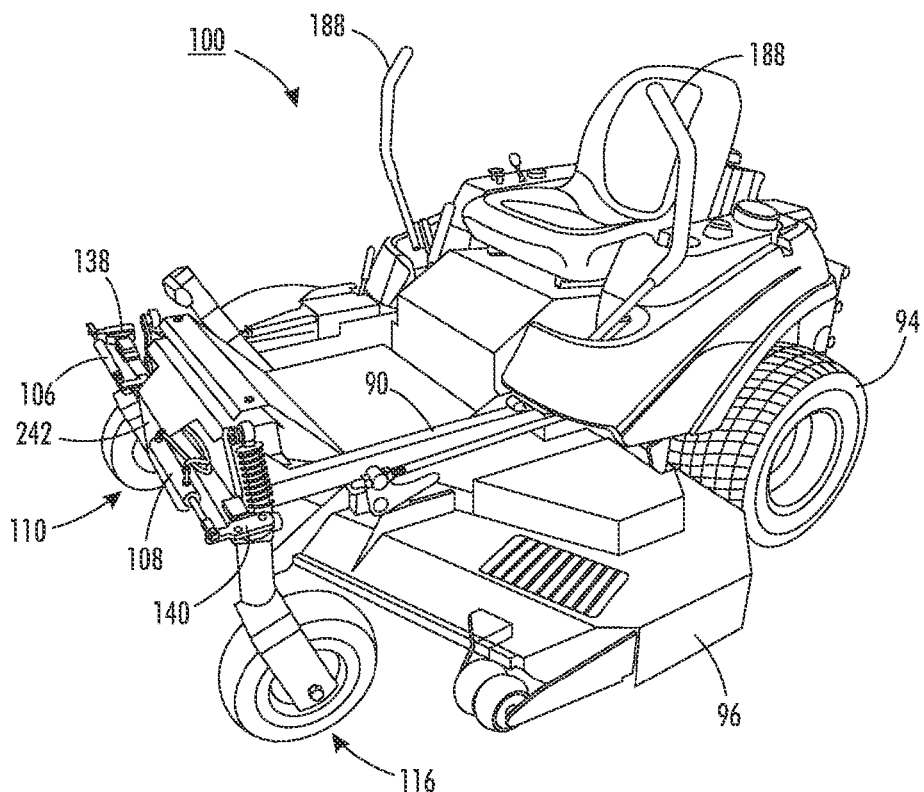

Referring now to the drawings, which are provided for purposes of illustrating embodiments of the ZTR mower with the Slope Traversing System, the overall system represented in FIGS. 1A-1B depict the principle elements of a ZTR mower 100 incorporating the Slope Traversing System and thereby having the capability of maintaining a substantially linear cut path while traversing a slope. It will be appreciated that the ZTR mower 100 may be one of various configurations, such as the Ferris, Model IS 500Z, depicted herein. ZTR mowers generally include a frame 90 and an associated power transmission system 92, for independently providing power to a pair of drive wheels 94. The mower 100 further includes one or more casters 110 and 116 to support the load of the frame, including a mower deck 96 attached to or suspended therefrom. As noted above, while the casters depicted in the embodiments herein are in front of the drive wheels, they may also be located behind the drive wheels in some ZTR mowers or other vehicles of this type (e.g., pallet loaders). Furthermore, while the casters 110 and 116 are described as free-wheeling in the embodiments that follow, it will be appreciated that aspects of those embodiments may also be applicable to ZTR vehicles that have other types of casters, or even other types of wheels.

As described, the Slope Traversing System may be programmed or "tuned" to operate within an angular slope range of the vehicle up to about 30 degrees, although the range is largely dependent upon the nature of the vehicle (e.g., rollover angle) and the manner in which it is used. As disclosed herein, the ZTR Slope Traversing System comprises two subsystems generally illustrated in FIG. 2A. A first subsystem 202 is a subsystem for applying a biasing force to one or more castors, and includes a biasing power supply 203 in combination with a castor bias mechanism 204. Subsystem 202 receives power from a vehicle power source 205 such as a generator, and receives control signals from the electronic subsystem 220. The electronic subsystem 220 includes a controller 104 receiving input (e.g., proper acceleration) from an accelerometer or similar device for measuring proper acceleration 130. Although described with respect to a pneumatic biasing force subsystem in FIG. 2B, it will be appreciated that the castor bias mechanism 204 may include one or more of the following devices, alone or in combination: a pneumatic cylinder, a pneumatic motor; a fluid driven cylinder; a linear electric motor; an electric solenoid; a rotary electric motor; a helix drive; a pulley and cable drive; and a chain and sprocket drive. Each of these devices is capable, alone or in combination, of applying a biasing force to the castor(s) (e.g., castor shaft) to resist the castor's tendency to pivot while the ZTR vehicle is traversing a sloped surface. Several of the devices are capable of directly coupling to the shaft of the castor and providing a biasing force through such a coupling. It is also possible to use a cam or similarly offset lever to impart the force created by the devices, for example as seen in the pneumatic embodiment described in further detail below. As for the a pulley and cable drive and a chain and sprocket drive devices, these would necessarily include a motor or similar component for generating the biasing force that is then applied, via the device, to bias the castor. Once again, such devices may be applied to the castor frame, castor spindle, or a lever attached thereto.

Figure 2A:
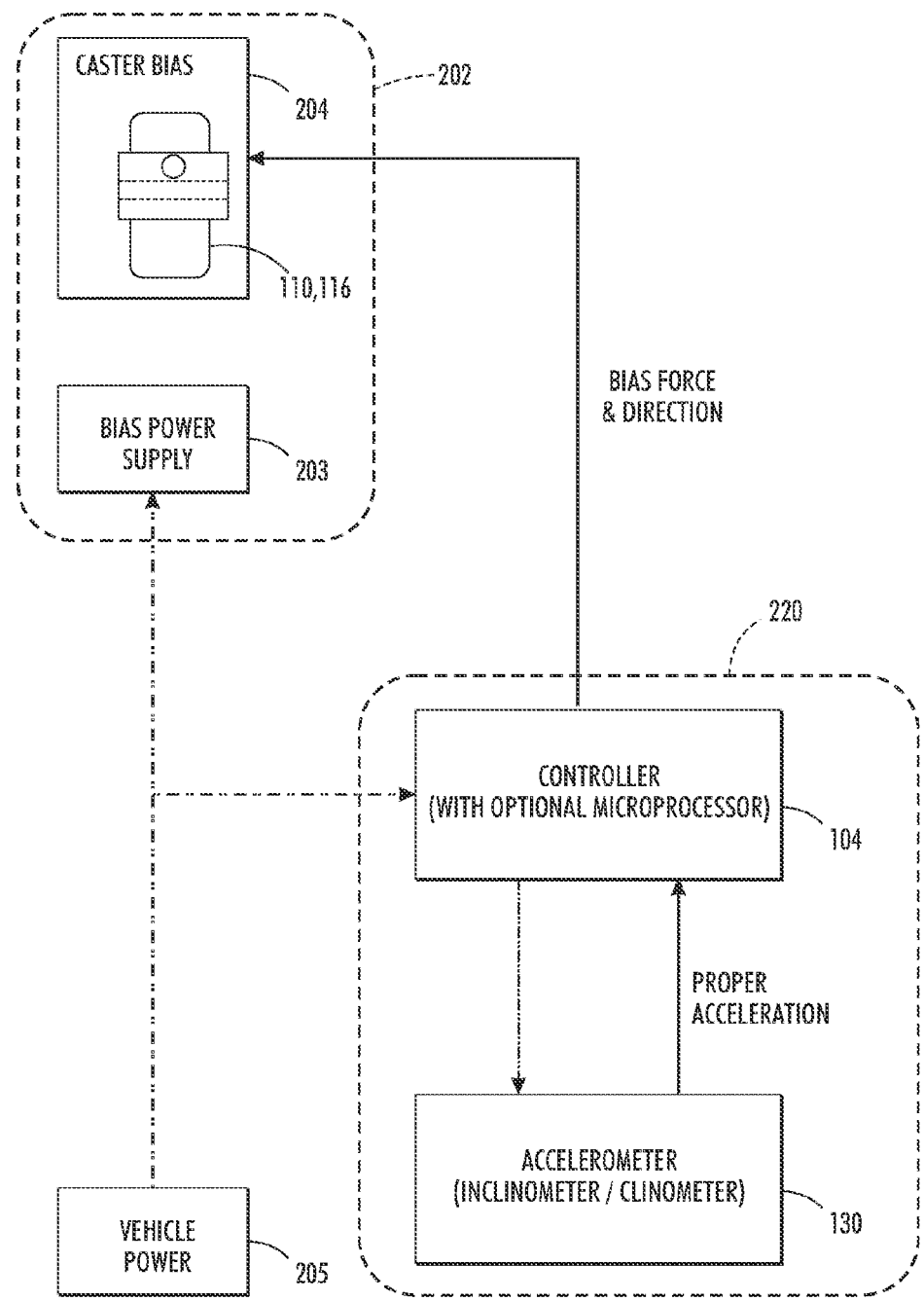
FIG. 2A depicts a block diagram of the slope control elements.
Figure 2B:
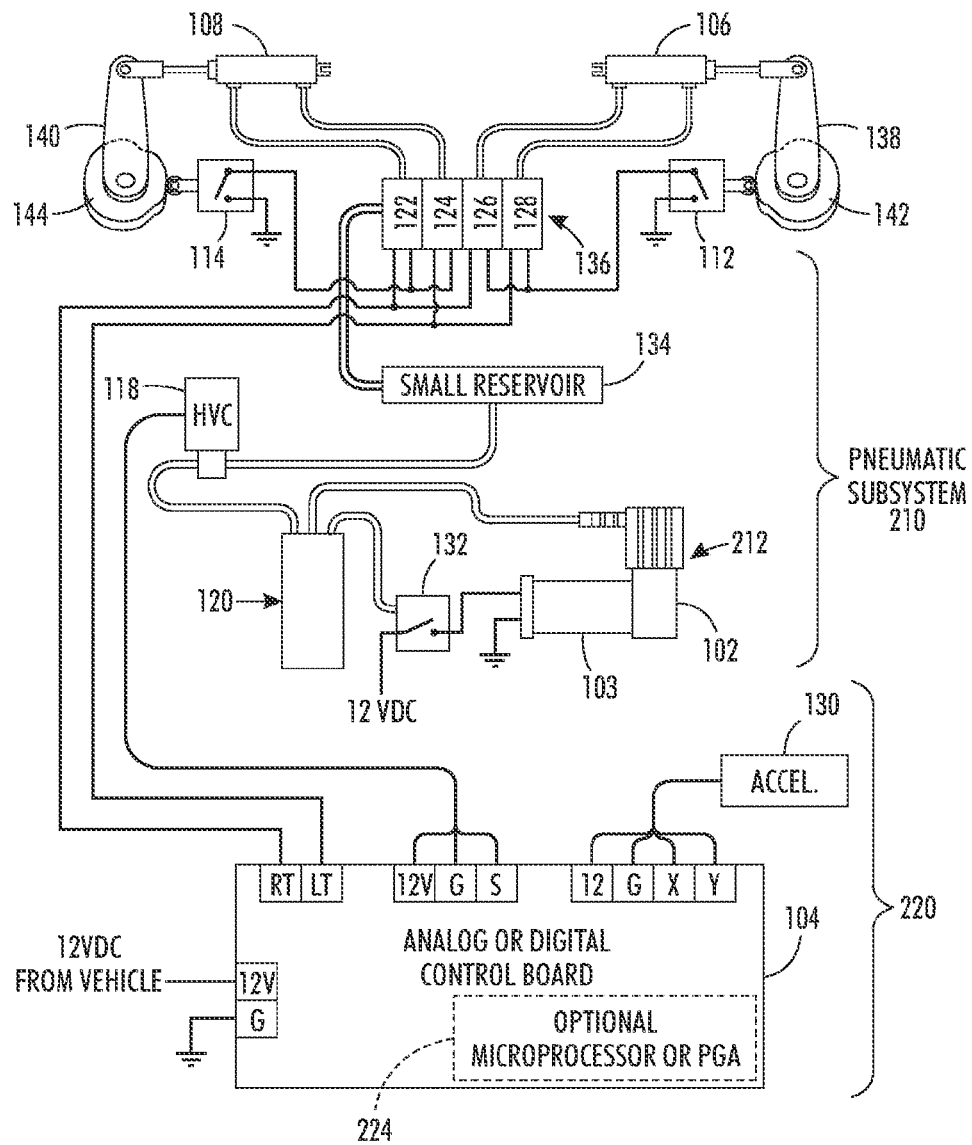
FIG. 2B depicts a more detailed block diagram of a particular embodiment.
Figure 3:
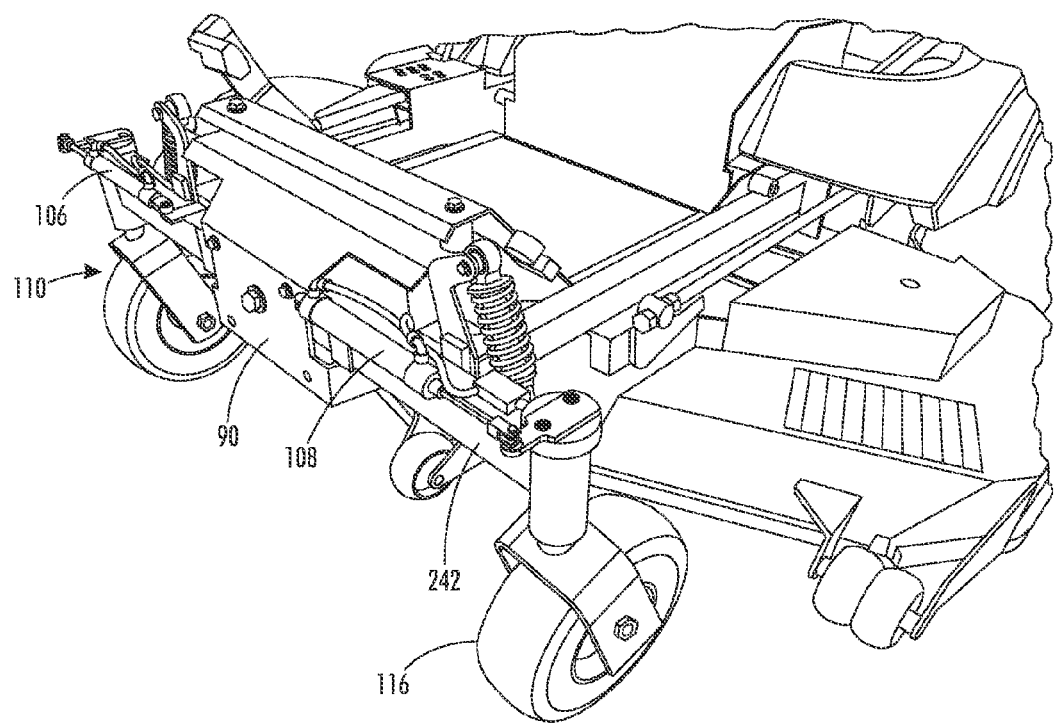
FIG. 3 is a pictorial bias view of the compensation cylinders.
Figure 4:
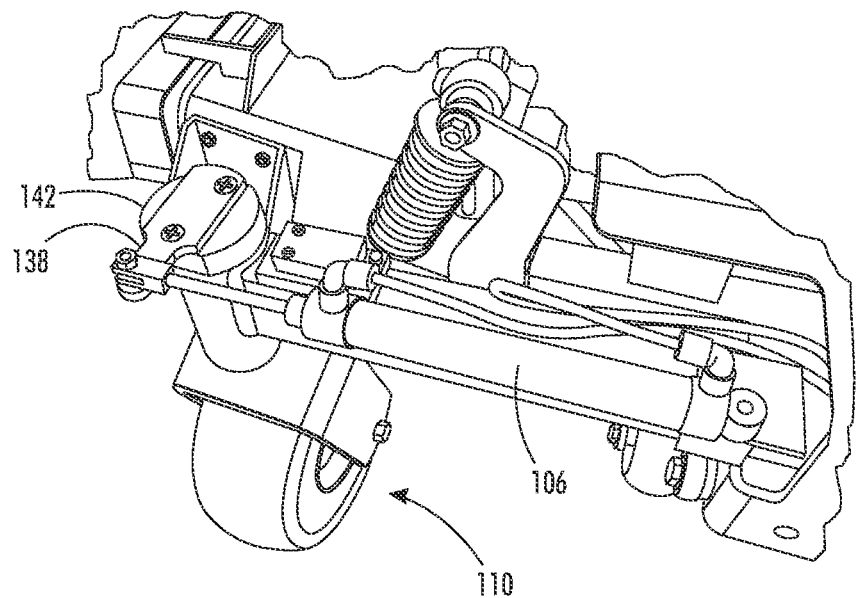
FIG. 4 is a pictorial top view of the first (e.g., right) cylinder.
Figure 5:
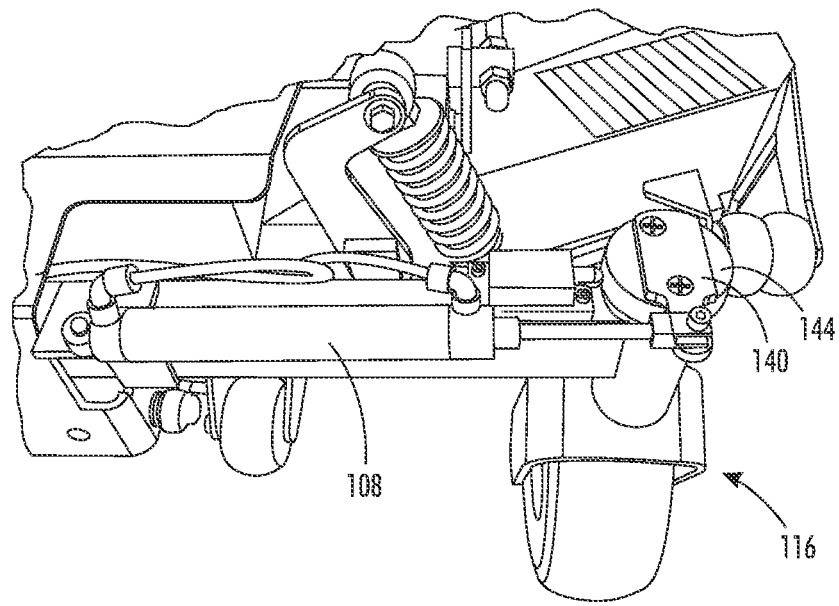
FIG. 5 is a pictorial top view of the second (e.g., left) cylinder.

FIG. 2B illustrates a more detailed block diagram of one embodiment of the system above. The Slope Traversing System consists of two subsystems. The first subsystem 210 is a pneumatic subsystem including, among other elements, a compressed air source 102 and pneumatic cylinders 106 and 108. The second subsystem 220 is an electronic subsystem including an accelerometer, or an inclinometer or clinometer, 130 and controller 104. The prototype embodiment uses an analog controller, however, a digital logic device such as a microprocessor or programmable gate array may be preferred in an alternative embodiment for commercial applications. In combination, the subsystems improve a zero turning radius vehicle having at least one caster that supports a portion of the vehicle weight, where the caster is operatively biased in response to the accelerometer.

Referring to FIGS. 1A-1B along with the associated pictorial illustrations of FIGS. 3-6, the push-pull pneumatic cylinders 106 and 108 are secured to the front suspension crossbeam 242 while the opposite end of the cylinders are operatively engaged, via lever arms 138 and 140 and pivotable clevis pins, to the kingpins 240 (FIG. 6) of casters 110 and 116, respectively. The pneumatic cylinders may be of various sizes in accordance with the particular ZTR mower or other vehicle to which they are attached, and in the illustrated embodiment, a stainless steel cylinder from Bimba (e.g., Model SR-095-DPWY) was used for each caster.

In a retrofit situation it will be appreciated that a kit or similar set of components may be used to implement the disclosed system on a ZTR mower. For example, the caster assemblies of FIG. 6 would be modified to permit the attachment of a lever arm or similar controlling mechanism that facilitates the application of a biasing or neutralizing force to the caster kingpin 240. For application to a ZTR mower during its manufacture, it will be appreciated that various alternative mechanisms may be employed to connect the pneumatic cylinders, or other control devices, such as motors (electric, pneumatic), a fluid driven cylinder, an electric solenoid, a helix drive, a pulley and cable drive, or a chain and sprocket drive, to the kingpins or other elements of the casters.

Figure 6:
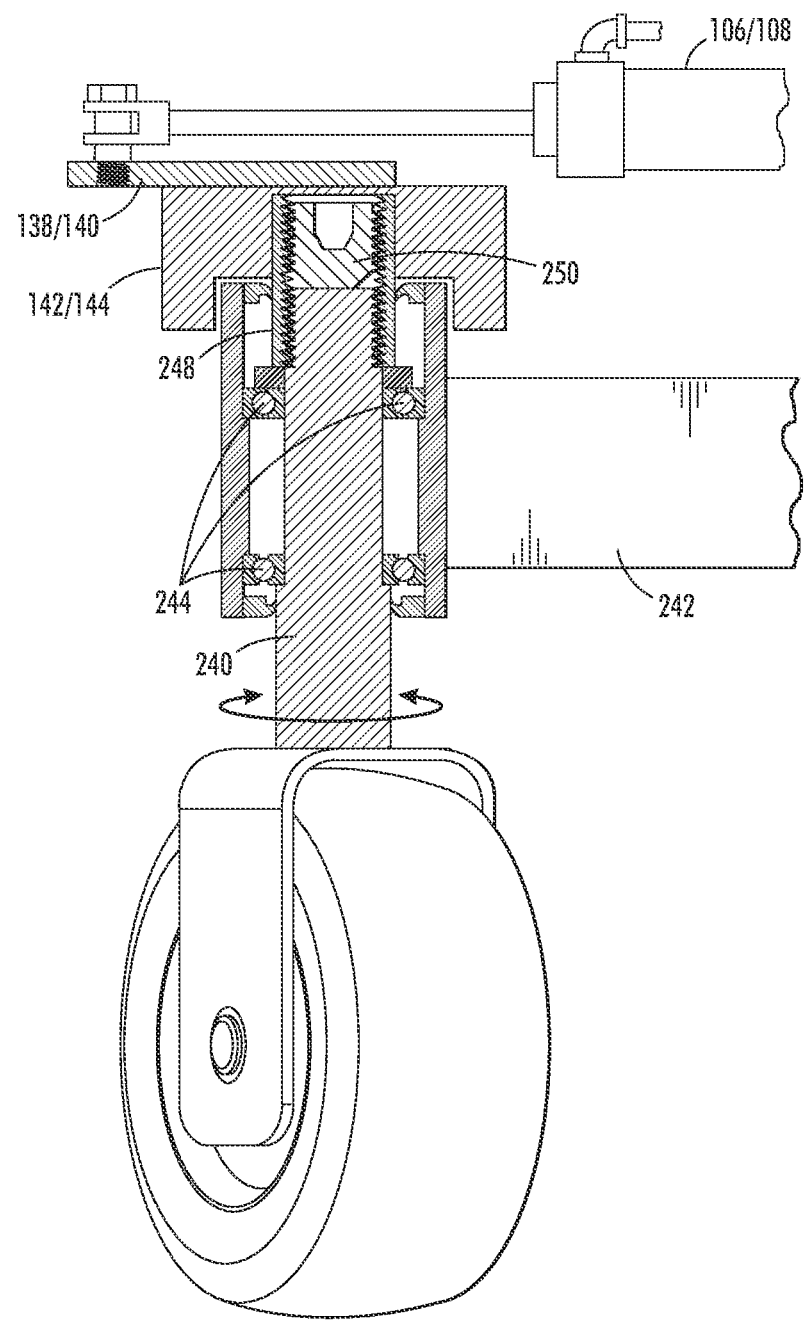
FIG. 6 is a cross-sectional view of the modification of a caster assembly in accordance with a disclosed embodiment.

FIG. 6 illustrates an effective retrofit embodiment for extending the caster kingpin or spindle 240 by replacing the cap nut with an internally threaded extension tube or cylinder having the same thread as the nut. More specifically, the caster includes a kingpin or spindle 240 that extends into the existing front suspension crossbeam 242 of the mower. The kingpin 240 is held in a pivotable relationship by bearings 244. More specifically, in the typical configuration, there is a shoulder at the bottom of the kingpin spindle that sits against the lower bearing, and a nut is used at the top that sits against the top bearing. The bearings are thus trapped between the shoulder at the bottom and the nut at the top. In the modification depicted, an extension tube 248 is threaded on the interior to match the threads at the top of the kingpin, and is screwed onto the top of the kingpin, thereby retaining the kingpin in the crossbeam frame. The extension tube is further retained in a "locked" position by a set screw 250 which places a binding force onto the threads on the top of the kingpin, thereby locking the extension in place. Cam 142/144 and the respective lever arms 138/140 are now able to be attached to the caster kingpin, and the balancing force from air cylinders 106, 108 transmitted to the casters due to the direct link provided. On new machines being built with this system factory installed, the spindles for the casters may be extended or otherwise mounts for the cams and lever arms provided. On machines already in the field, the spindles can be extended as illustrated in FIG. 6, without remaking the casters. In summary, the extension tube 248 is threaded all the way through and set screw 250 is inserted from the top and tightened against the kingpin (spindle) to prevent the tube from coming loose. The cam is mounted on the extension tube and the lever arm is mounted on top of the cam.

Figure 7:
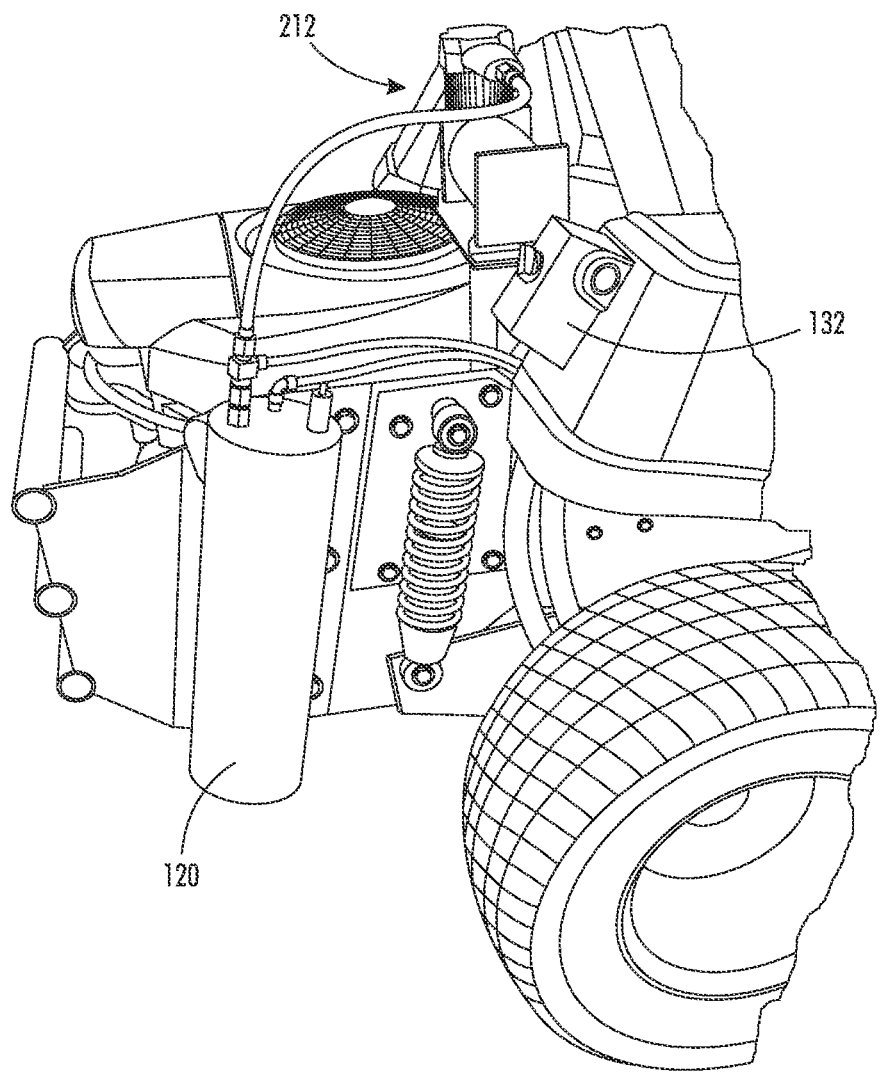
FIG. 7 is a pictorial side view of the pneumatic power supply.
Figure 8:
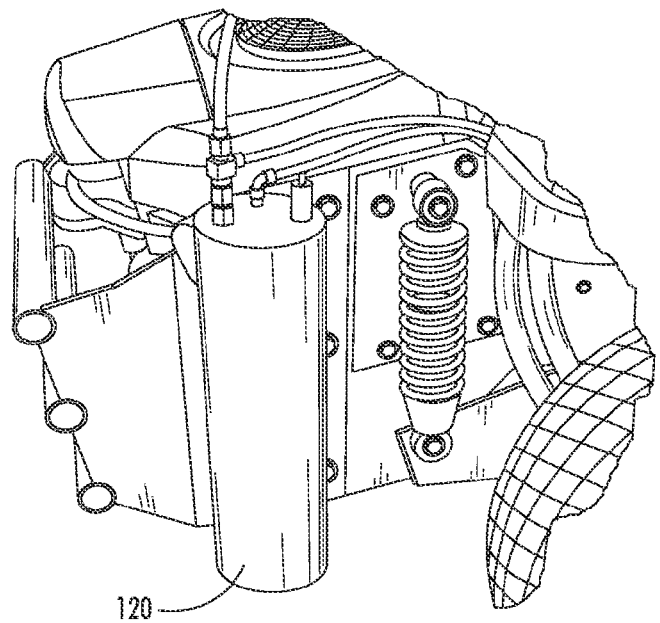
FIG. 8 is a pictorial side view of the pneumatic reservoir.
Figure 9:
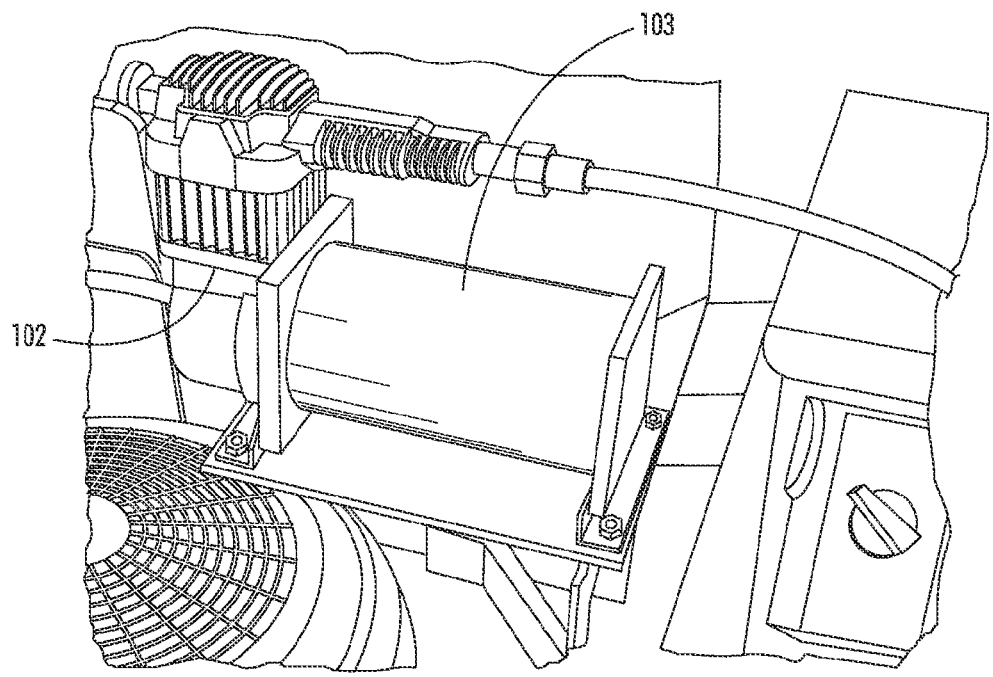
FIG. 9 is a pictorial rear view of the pneumatic compressor.
Figure 10:
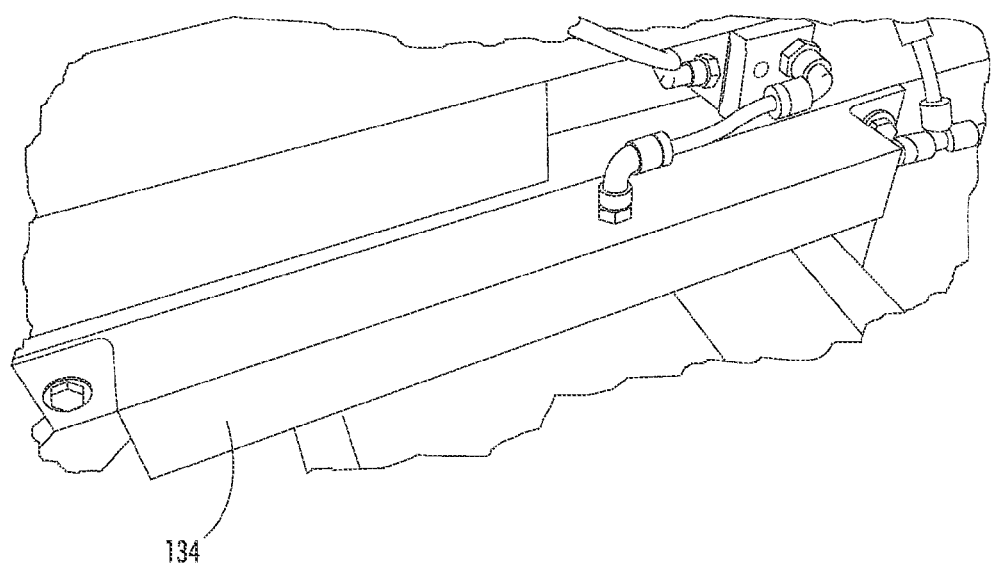
FIG. 10 is a pictorial top view of the buffer tank.

Also considering FIGS. 7-10 and 15, depicted therein are additional elements of the pneumatic pressure subsystem 210. The pressurized air is generated using a DC driven compressor system 212 as generally depicted in FIG. 7. Compressor system 212, such as a model 330C manufactured by Viair, includes a DC motor 103 driving a compressor 102, whereby adequate voltage to operate the motor is supplied from the mower power system, and further includes an associated piston, rotary, wobble or similar compressor chamber. Alternative compressed air sources may include an on-board air tank or a compressor integrated with or driven by the mower engine. Regulator switch 132 controls the power to air compressor 102 and is responsive to a low turn-on and a high turn-off pressure or pounds/sq. in. (PSI) setting. Reservoir tank 120 stores a volume of air to minimize the cycling of compressor 102. Pressurized air from reservoir tank 120 is provided to an electro-pneumatic air pressure regulator (HVC) 118, which further regulates the pressure applied to the cylinders via a buffered air reservoir 134 depicted in FIG. 10. Buffer air reservoir 134 buffers the pressurized air applied to a plurality of control valves 136 (122, 124, 126, 128) and in turn the cylinders 106 and 108 as further described below. The pressure supplied by the regulator 118 to the air reservoir 134 and the air valves 136 (122, 124, 126 and 128) is determined by the electronic subsystem 220 in response to the angle of the side slope that the mower is on. The volume of reservoir 134 is equal to about two to three times the total volume of the cylinders and is intended to reduce the volume of compressed air required to operate the cylinders by recapturing, instead of venting, the backside air pressure from the dual acting piston within either of the cylinders.

Figure 11:
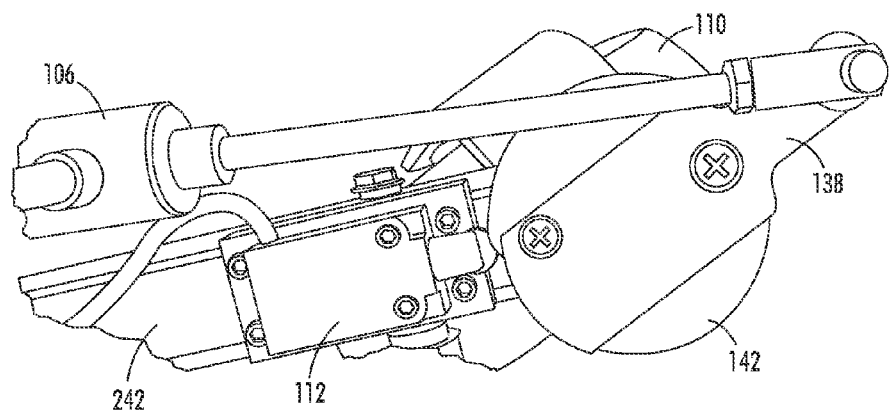
FIG. 11 is a pictorial top view of the right cam.
Figure 12:
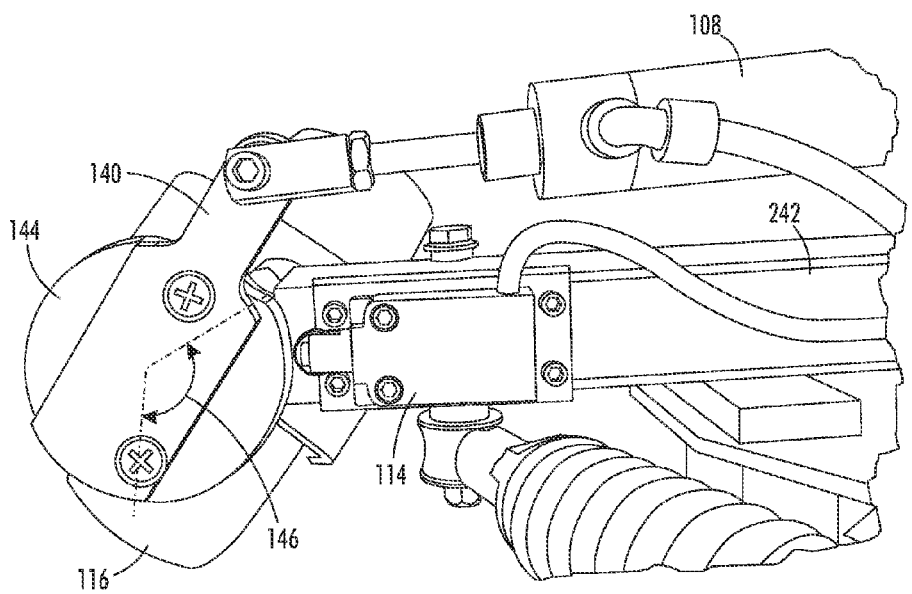
FIG. 12 is a pictorial top view of the left cam.

Briefly referring to FIGS. 11 and 12, lever arms 138 and 140 respectively attached to cylinders 106 and 108, pass over the turning axis of the casters, thereby allowing for 360-degree rotation of each of the casters. Cam 142, in combination with cam follower switch 112, monitors the relative position of caster 110 for the purpose of disabling the counterbalance system when the caster is not in a generally forward-moving direction, such as moving in a reverse direction or executing a relatively sharp turn. For example, first cam 142, has a first lever arm 138 attached thereto. And, second cam 144 has second lever arm 140 attached thereto. Each cam includes a positive cam lobe portion 146 (FIG. 12) which actuates the respective switch 112 or 114. The positive cam lobe portion extends over about a 120-degree range, or approximately 60-degrees left and right of the forward moving centerline or normal position for the caster. The actual angular range may vary depending upon the particular vehicle. When the cam following switch 112 or 114 engages the negative cam lobe, the switch is deactivated and the respective valves are closed and the cylinder vented to air as seen in the block diagram of FIG. 2B. Venting the cylinder to air results in removing all biasing force from the cylinder and permits the caster to continue to freely pivot. Various alternative means for monitoring the position or angular orientation of the caster or its king pin are possible, including a digital encoder, a disk in combination with a through hole light sensor, a reflective disk with a light sensor, a magnetic field sensor, a proximity sensor, a chromatic disk using a color sensor and the like.

Strictly speaking, a cam is not necessary when using air cylinders to supply the balancing force, but some improved predictability in handling is achieved by using the cams 142/144 and switches 112/114 (or similar rotational position sensors) to deactivate the individual air cylinders when the corresponding caster is not within approximately 60° of straight or normal. With the analog control system disclosed herein, the switches allow deactivation of an air cylinder without having to deal with the logic on the control board. It may be preferable to use a micro controller to control the system and have the cams replaced with sensors that provide additional inputs to the controller.

While mowing on a substantially level plane, the casters are free to track in the direction determined by the independently driven rear wheels. Therefore, when the gravitational force acting on the mower passes generally through the center of mass of ZTR mower 100, the force vector is normal to the cutting plane and therefore absent any side loading. Consequently, the effective biasing forces of cylinders 106 and 108 on casters 110 and 116 are minimal. In other words, the casters track and respond immediately to any change in direction of ZTR mower 100 as designed. Notably, the slope compensation system is effectively idle or inoperative when mowing on level turf.

As previously noted, one aspect with such ZTR vehicles is that when the vehicle is being maneuvered on the side of a hill, the weight of gravity tends to pull and then direct the vehicle down the hill. The portion of the weight of the vehicle positioned ahead of the driven wheels, and thereby supported by the caster wheels, causes them to tend to turn down the hill, even when the operator is attempting to steer the mower to counteract the gravitational side force. The Slope Traversing System utilizes the pneumatic cylinders to provide a biasing or counteracting force at the casters to balance out the downhill force created by the g-forces acting on the mower. Although described herein relative to a pneumatic system, it is noted that it is possible to produce the balancing force applied to a caster(s) using alternative means, such as a pneumatic motor, linear electric motor; electric solenoid; rotary electric motor; helix screw drive; or a pulley and cable drive system.

Figure 13A:
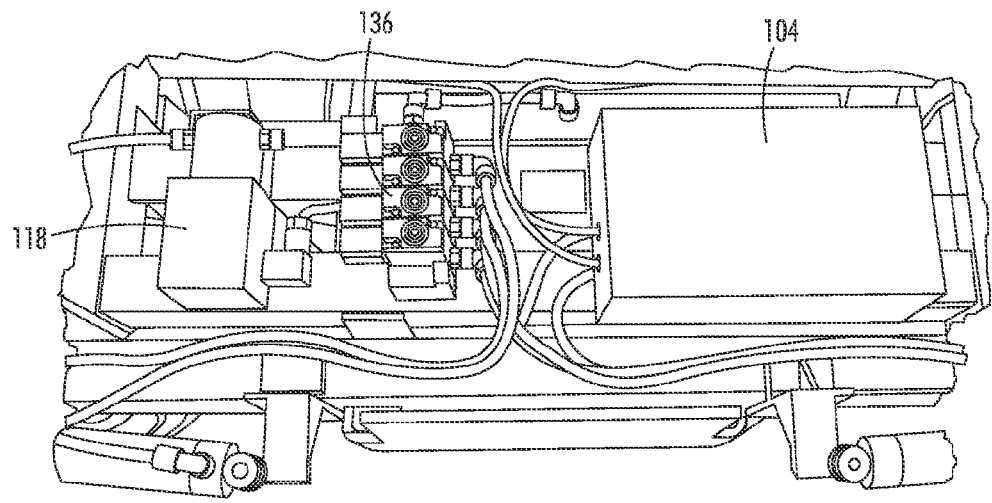
FIG. 13A is a pictorial top view of the controller, quad valve assembly and regulator.
Figure 13B:
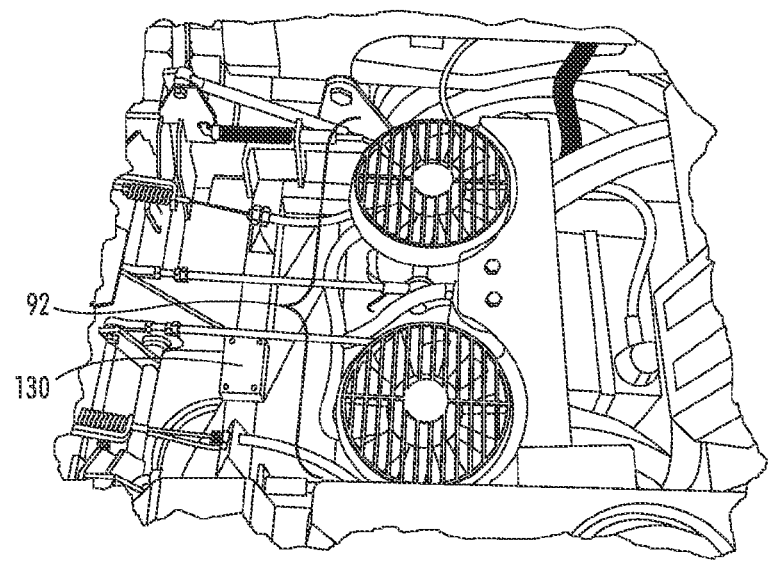
FIG. 13B is a pictorial top view of the location of an accelerometer in accordance with one embodiment.
Figure 14:
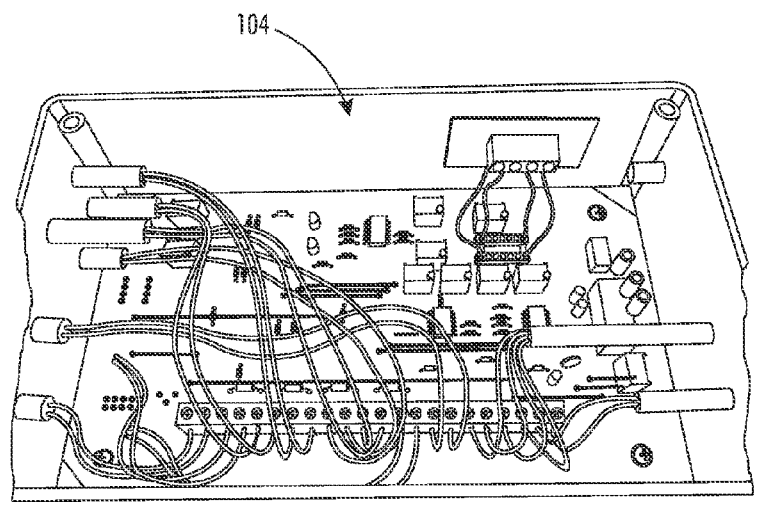
FIG. 14 is a pictorial top view of the analog controller printed circuit board (PCB)
Figure 15:
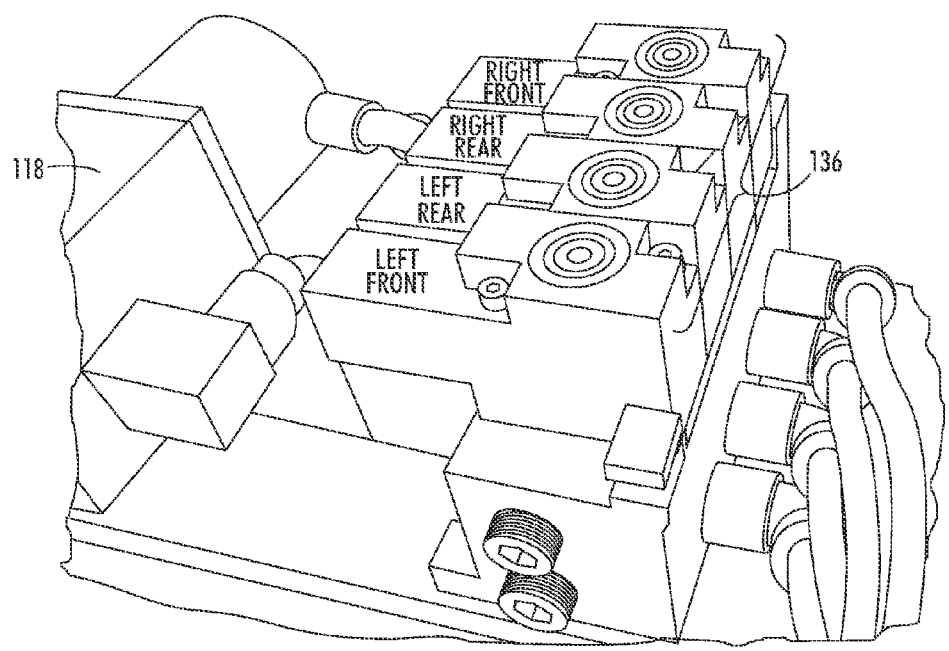
FIG. 15 is a pictorial top view of the quad valve assembly.

Having generally described the pneumatic subsystem, the utilization and control of the pneumatic subsystem will be described relative to the electrical control subsystem. Referring once again to FIG. 2B and pictorial images of FIGS. 13A-B and 14, depicted therein are several components of the control subsystem. Controller 104 operates on a signal output from a sensor such as accelerometer 130, and in turn supplies an output voltage directly proportional to the composite forces of gravity acting on the mass of the ZTR mower. Although described herein and depicted as an analog controller, it will be appreciated that a digital control system may also be used. Moreover, a digital system may prove to be not only more cost effective, but may enable the wider use of the system as it may be easily (e.g., programmatically) adjusted for the type of vehicle upon which the Slope Traversing System is installed.

Accelerometer 130, for example a DE-ACCM2G2 accelerometer from Dimension Engineering, is a micro-electromechanical device used to measure changes in proper acceleration. Although an accelerometer suitable for sensing proper acceleration in two, perpendicular directions was used, it will be appreciated that an accelerometer with the capability of sensing proper acceleration in at least one direction would be adequate. The accelerometer is mounted with the at least one sensing direction perpendicular to the front-rear axis of the vehicle so that it characterizes the proper acceleration of the vehicle perpendicular to the front-rear axis (see axis F-R in FIG. 1A), or in other words measures the G-force exerted by gravity that is pulling the machine sideways, as it does when the machine is traversing a slope. The accelerometer is mounted slightly ahead of the drive wheels to minimize perturbations, and to accurately characterize the forces acting on the system. The accelerometer may be of any type, including: piezoelectric, strain gauge, magnetic field, optical, electromechanical servo, capacitive, or any other type commonly used, all of which may be used separately or in combination. In essence, any device suitable for providing a real-time output that is indicative of the angle of the mower or forces acting thereon while traversing a slope may be suitable for use as an accelerometer to provide input to the control system (analog or digital).

The voltage output to controller 104, corresponding to the acceleration G force being exerted due to a tilt of the mower, is relative to the horizon. In order to be more specific, the vendor's specified output voltage of accelerometer 130, when the ZTR mower is on a level surface is 1.65 v. When the mower is used on the side of a hill, and, for example, accelerometer 130 outputs a voltage of 1.75 v, then 1.75 v−1.65 v=+0.10 v relative to zero side load. Now, having a specified sensitivity of 660 mv/g the detected force would be equal to 0.10 v divided by 0.660 v/g which equals 0.15 g. The 0.15 g times the weight on the casters gives the side force trying to steer the vehicle downhill. Using the output of the accelerometer, the electronic subsystem can then calculate the proper output to the electro-pneumatic regulator to balance this force.

Also, the rotational force induced by gravity in the casters is dependent on the angle of the caster relative to straight (normal). As an example, say the front of the mower weighs 400 pounds and the mower is going straight across a 30° slope. Gravity will induce ½ G of force on the front on the machine, which is 200 pounds, or 100 pounds per caster for a machine with two casters. The torque that 100 pounds induces is dependent on the offset of the caster. If there is 2 inches of offset, the torque is 200 inch-pounds, but only if the caster is straight relative to the mower. Note that straight to the mower is always perpendicular to the measured slope since the accelerometer is mounted to read the G force perpendicular to the front-to-rear (F-R) axis of the mower. If the mower is turning when the 30° angle is achieved, gravity will still induce ½ G of force on the front of the mower, but the casters will not be straight to the mower. Therefore, the effective offset of the caster would no longer be 2 inches, and less torque is induced into the caster. As will be recognized, the air cylinders act through a lever (e.g., 138, 140 in FIGS. 4, 5) that turns with the casters, and therefore the air cylinders also lose leverage when the casters are not in the normal position. As a result, the proper balancing torque is achieved regardless of the angle of the caster, without changing the air pressure. Just as gravity always exerts the same force for a given side inclination of the machine, but induces a torque that is dependent also on the angle of the casters, the controller will always set the same air pressure for a given inclination, but the air cylinders will produce a torque that is also dependent on the angle of the caster. It will be appreciated that the geometry of the system results in the reduction in torque induced by gravity due to the angle of the caster being the same as the reduction in the balancing torque exerted by the air cylinders. Everything is in balance. However, this is not the case if a rotary type actuator were used. If a rotary actuator is used, some sort of absolute position encoder would be required to read the angle of the caster(s) so that the controller could not only adjust the torque but also reverse (or turn off) the torque if the machine were reversed. Such a system would likely be expensive, but might be adjusted or programmed to provide more biasing force when the casters are at an angle.

By design, the detection of a slope by accelerometer 130 initiates two actions. First, a voltage, proportional to the angle of the slope detected, as calculated above, is used to control an output air pressure level (PSI value) for application to the pneumatic cylinders by sending a proportional 0-10 vdc signal to electro-pneumatic pressure regulator (HVC) 118, such as an HVCE 100A from PROPORTIONAIR. In other words, the angle detected by the accelerometer 130 results in a signal that is processed to control the regulated pressure applied to the pneumatic cylinders so that the bias force increases as the angle of the slope being traversed increases.

Subsequently, two of the four valves, within quad-valve assembly 136, will be energized, depending on the direction of travel of the ZTR mower relative to the slope. For example, in the case of a clockwise rotation of the mower frame, (i.e. the left side is uphill and the downhill caster is 110) valve 128 would be opened to provide air pressure to the front side of cylinder 106 to pull caster 110 into or up the hill, as valve 124 supplies air pressure to the backside of cylinder 108 to push caster 116 into the hill, as well. Conversely, air valves 122 and 126 would be opened for a counterclockwise bias. It should be clear that controller 104 is in no way intended to directly steer the mower, but rather regulates air pressure to provide a bias force to overcome the tendency of gravity to pull the front of the mower downhill, only when traversing a hillside, to minimize the tearing up the turf caused by the slippage from the overdriven rear wheels.

Generally referring to the electrical schematics of FIGS. 16A-19, the relationship of the various constructive elements of the analog electronic subsystem is shown. More specifically, FIG. 16A-E respectively illustrate the unregulated 12 vdc from the mower (FIG. 16A) distributed to the 5 vdc regulator (FIG. 16B) used to power the accelerometer, as well as other components, a 3.0 vdc power supply (FIG. 16C) used to supply control voltage to the electro-pneumatic pressure regulator when the manual buttons are actuated, a 12 vdc polarity inverter (FIG. 16D) for operational amplifier #1 and #2, as well as other components, and a 1.0 vdc power supply (FIG. 16E) used to provide a minimum voltage signal to the electro-pneumatic regulator as described in paragraph [0043].

Figure 17A:
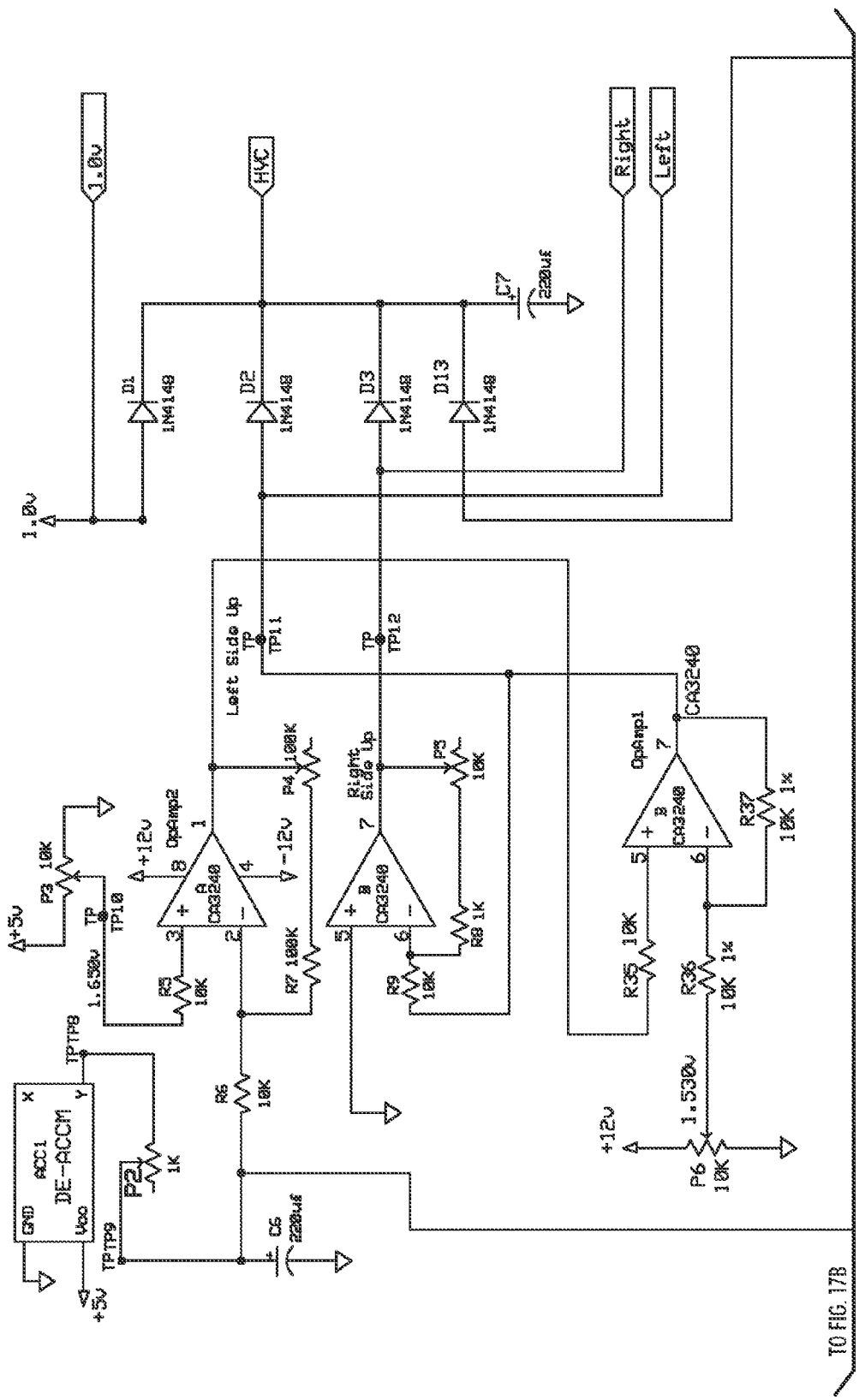
Figure 17B:
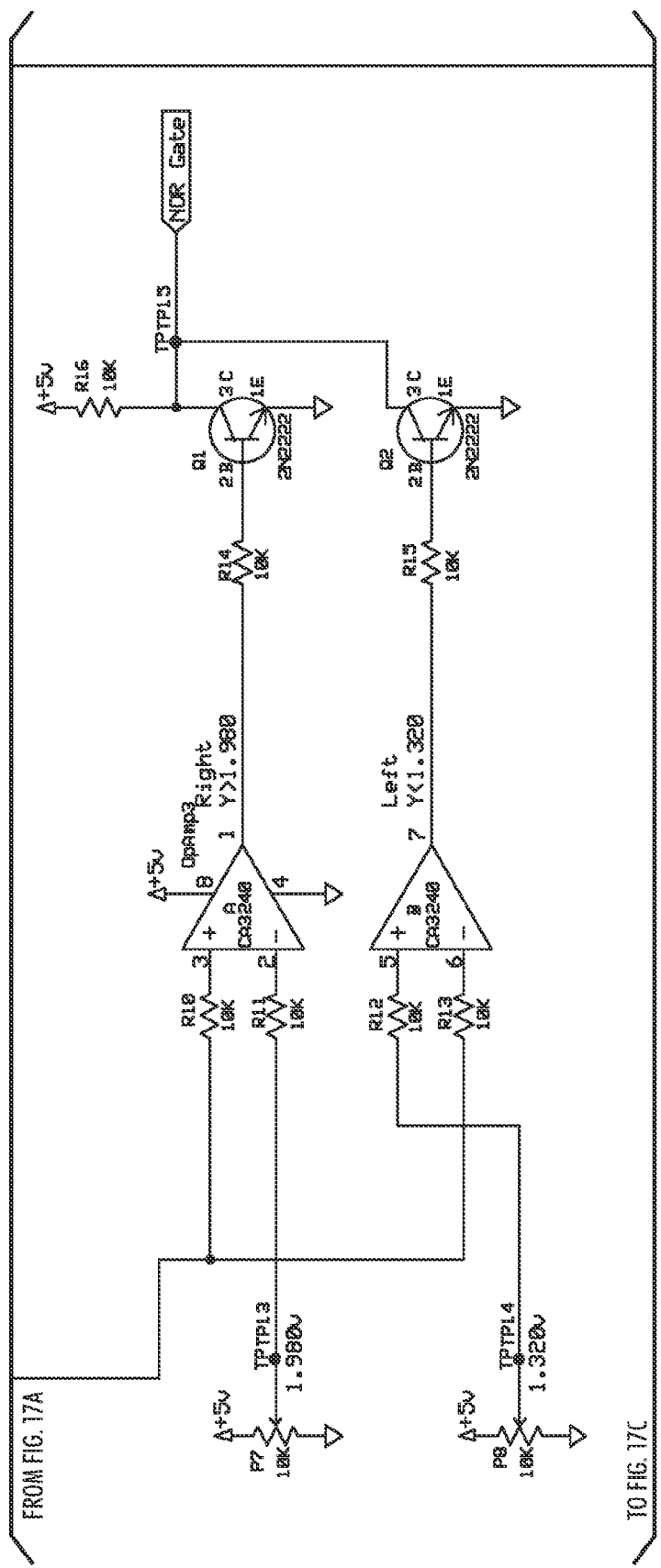

In FIGS. 17A-C, FIG. 17A includes accelerometer 130 (DE-ACCM) in conjunction with the left and right operational amplifiers that provide a slope proportional voltage between 1.0 v and 9.3 v to the electro-pneumatic pressure regulator (HVC) 118. The system can be controlled by either analog or digital circuitry, as described in paragraph [0047] below. In either case, an accelerometer or similar means of sensing inclination is used to determine the side angle of the mower and thereby the gravitational force acting on the front casters. Generally, a mower is used on rough terrain, which necessitates an averaging or damping of the signal from the accelerometer in order to get an accurate reading of the angle of the mower. In analog applications, it is not possible to use a standard capacitor with parallel resister to do the signal damping function. The accelerometer uses an op-amp to produce its output. As a result, the voltage on the capacitor will be increased or drained off immediately through the op-amp. To prevent this, a variable resistor is used in series with the capacitor (FIG. 17A, component P2) to slow the op-amp's ability to instantly change the voltage on the capacitor. No resistor is used in parallel with the capacitor. The amount of damping can be controlled by varying the resistance of the variable resistor. The rest of the circuitry reads the charge on the capacitor to determine the accelerometer's output.

Referring next to FIG. 17B, a high-limit safety feature is provided whereby anytime the ZTR mower 100 encounters an incline angle of more than about 30 degrees, the quad-valve assembly 136 immediately shuts down the air pressure being supplied to cylinders 108 and 106, thus removing any bias and allowing casters 110 and 116 to naturally direct the mower down the hill to prevent a roll over. As noted on the diagram, an output voltage of either 1.98 or 1.32 (+/−0.33V from nominal output of 1.65 v at level) will trigger the NOR gate (Q1 and Q2) and close all valves 122, 124, 126 and 128. More specifically, an angle of 30 degrees provides about 0.5 G (0.66 v/G), and thus an output of 0.330V, and if the nominal 0 G value is 1.65, then the high limit to prevent a roll over is 1.65+/−0.330 v.

In addition to or instead of the response described above, the system may also, upon detecting that the mower is at or approaching the rollover angle, produce an alarm and/or reduce the speed of the machine. The alarm may simply be a visual and/or audible output that is triggered by the high-limit circuitry. The speed control of the machine would, in response to similar signals, reduce the power applied to the drive wheels of the mower.

Also contemplated is the capability to further control the biasing force applied to the caster as a function of the position of the caster relative to a normal (forward direction). In such an embodiment, the caster position would be known more precisely using one of the sensing techniques disclosed herein (e.g., an encoder associated with the king pin) and the biasing force applied to the caster would increase as the caster deviated from the normal orientation.

Figure 16A:
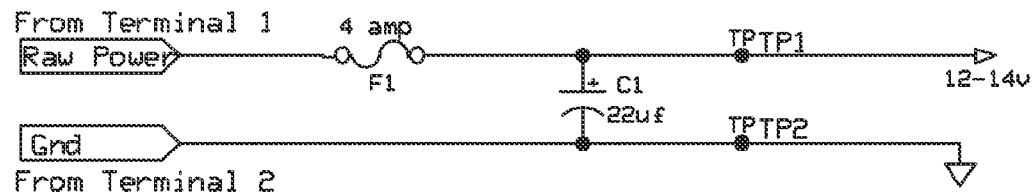
Figure 16B:
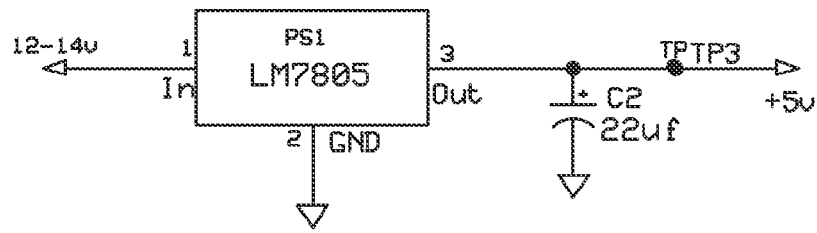
Figure 16C:
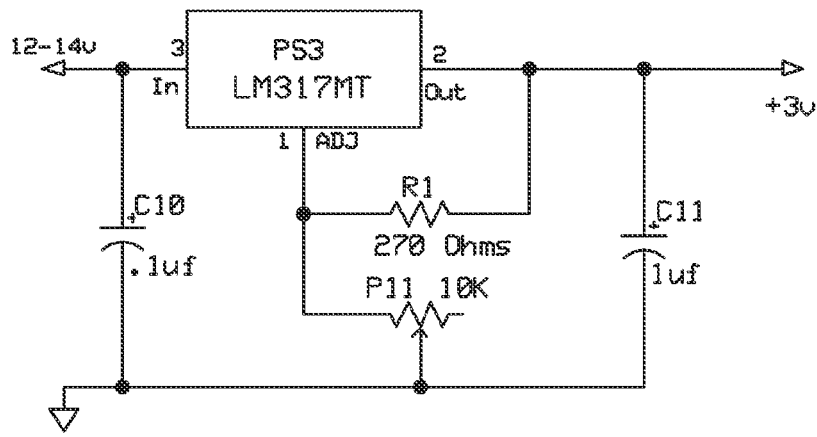
Figure 16D:
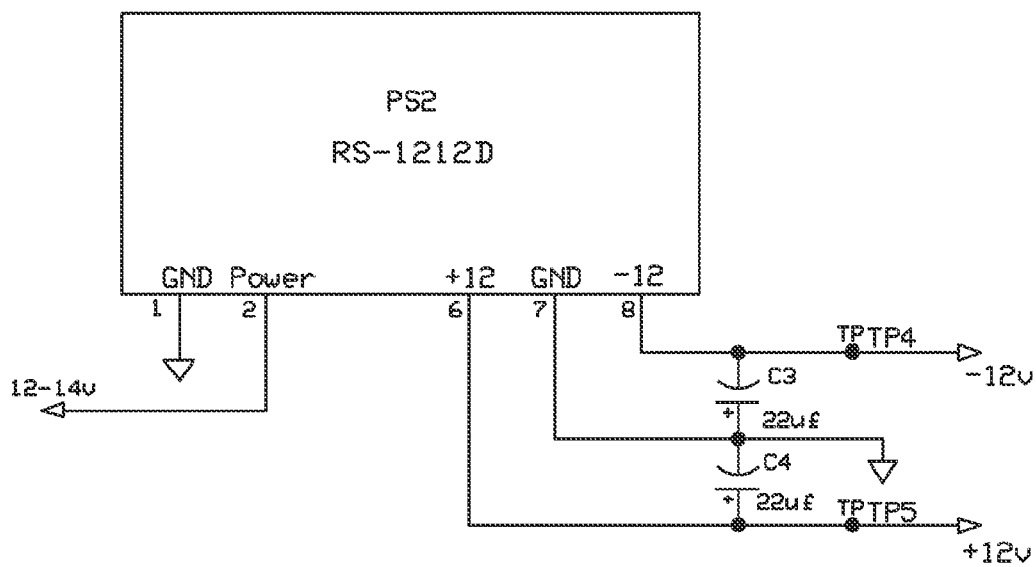
Figure 16E:
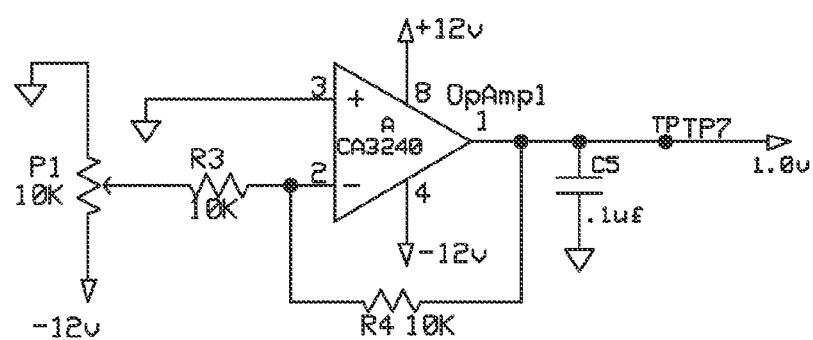

Also referring to FIG. 17A, it can be seen that the 1.0 volts from the power supply shown in FIG. 16E is connected to the electro-pneumatic pressure regulator HVC 118 through a diode. Because of the voltage drop across the diode, this results in a minimum voltage of about 0.5 volts being delivered to regulator 118, which in turn results in a minimum pressure of about 10 PSI always being delivered to reservoir 134 and the four air valves 122, 124, 126 and 128. While the system would be functional without this minimum pressure, it conserves compressed air. When the vehicle is operating on relatively flat ground, there is no real need to have the system active. The 1.0 volt minimum results in a pressure suitable for neutralizing forces on the casters that correspond to a very low angle of about 2 to 3 degrees. Referring to FIG. 18, OpAmp4 compares the voltage calculated for the particular slope the vehicle is on to the 1.0 volts reference. Only if the calculated voltage is higher than the 1.0 volts will the air valves turn on. Thus, compressed air is saved, not only by avoiding turning on balancing pressure when it is not needed on very gentle slopes, but also by not venting the 10 PSI in reservoir 134 whenever the machine is on relatively level ground.

Figure 18A:
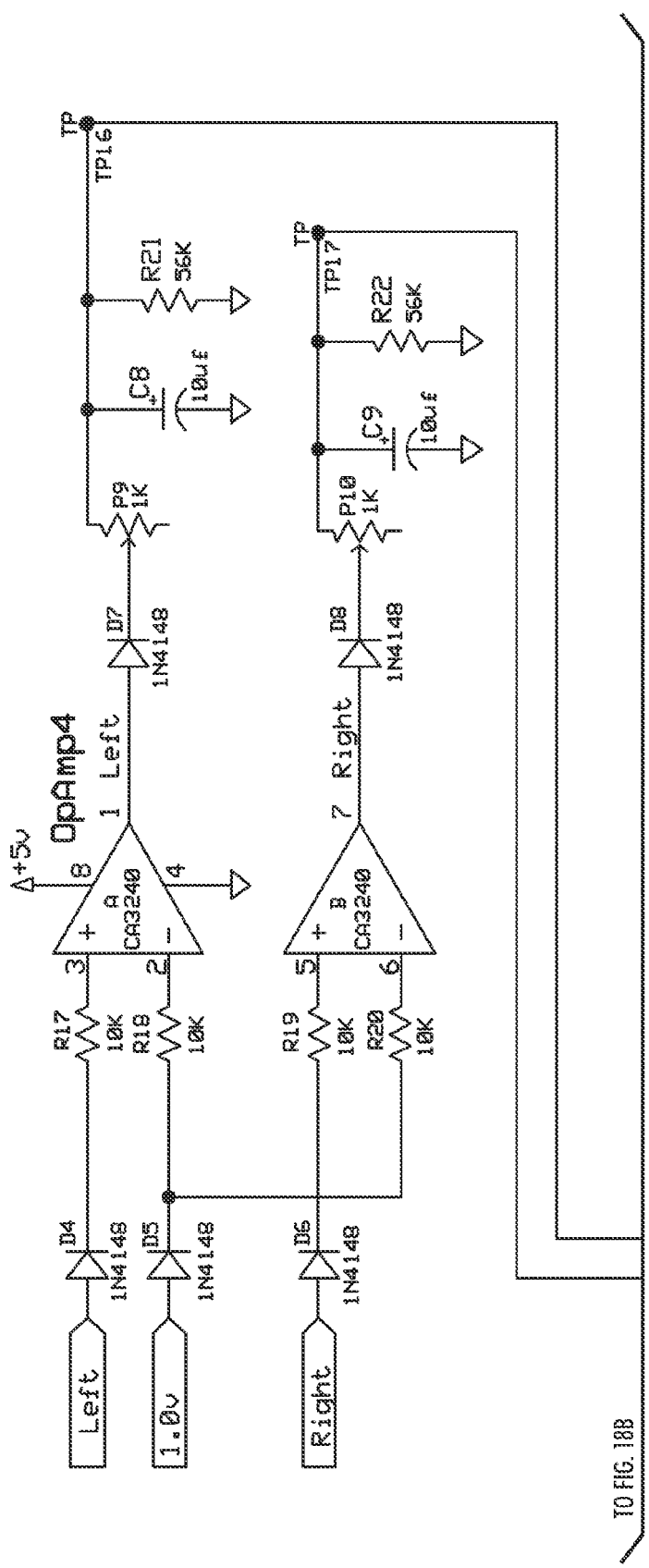
Figure 18B:
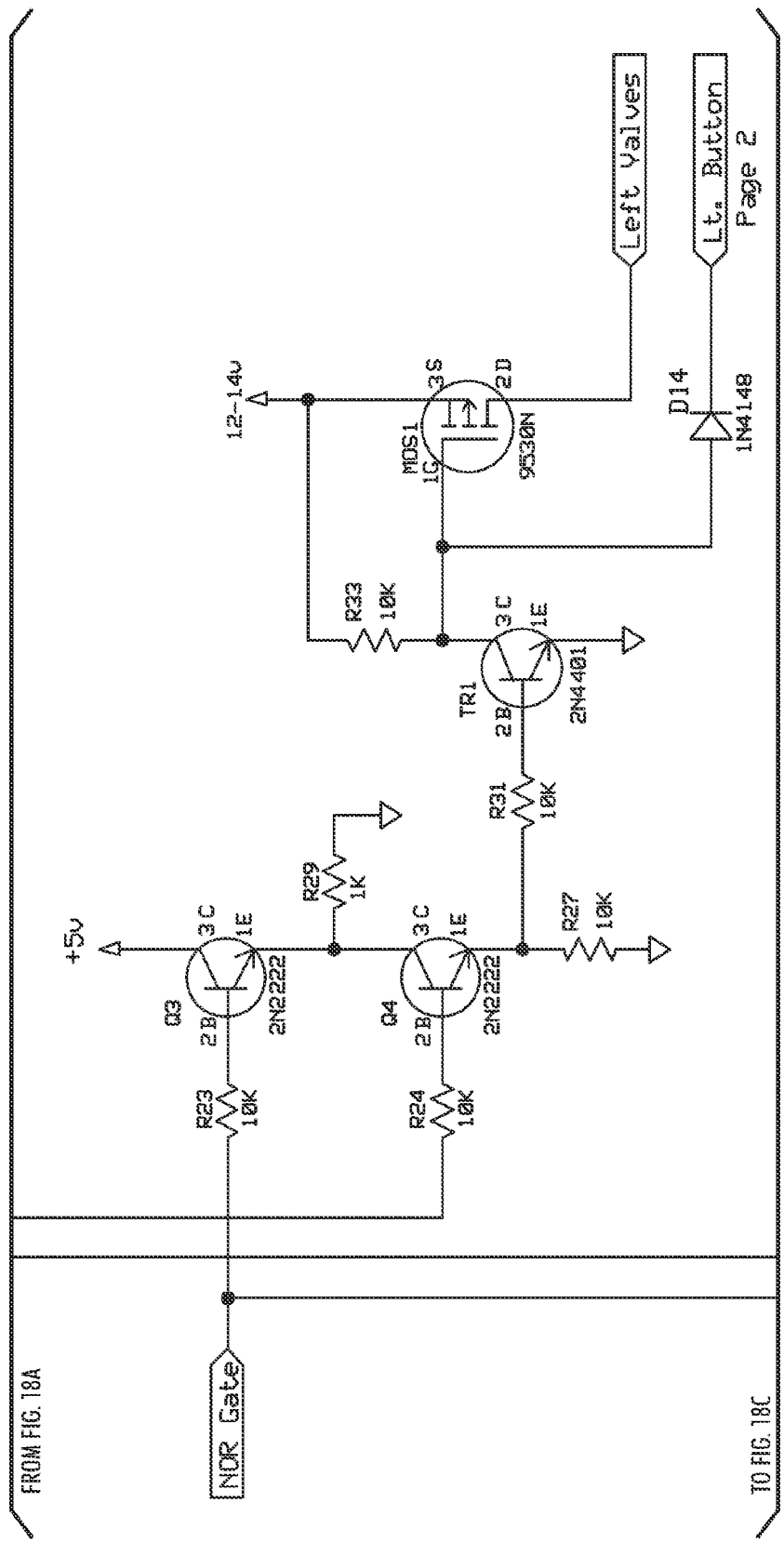
Figure 18C:
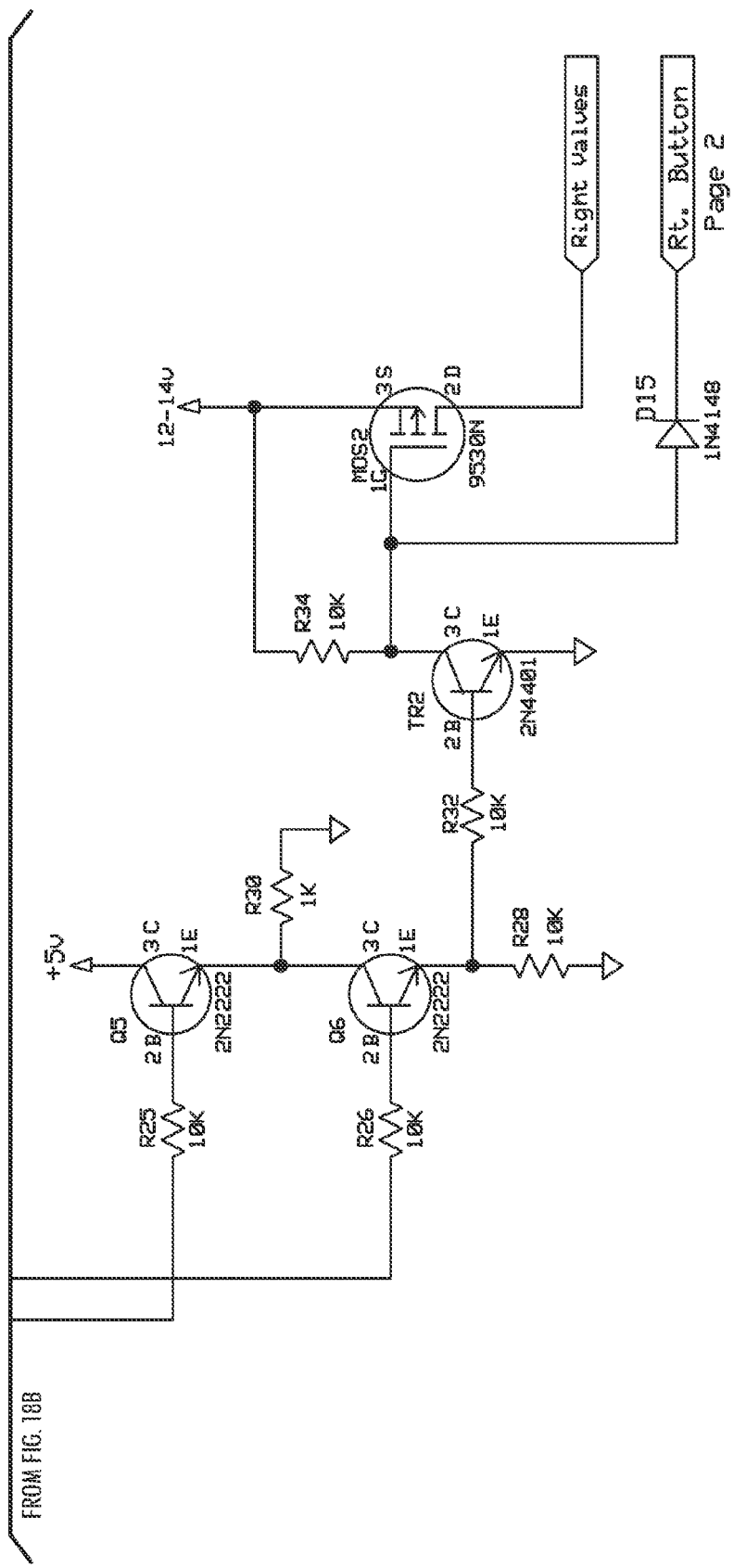
Figure 20:
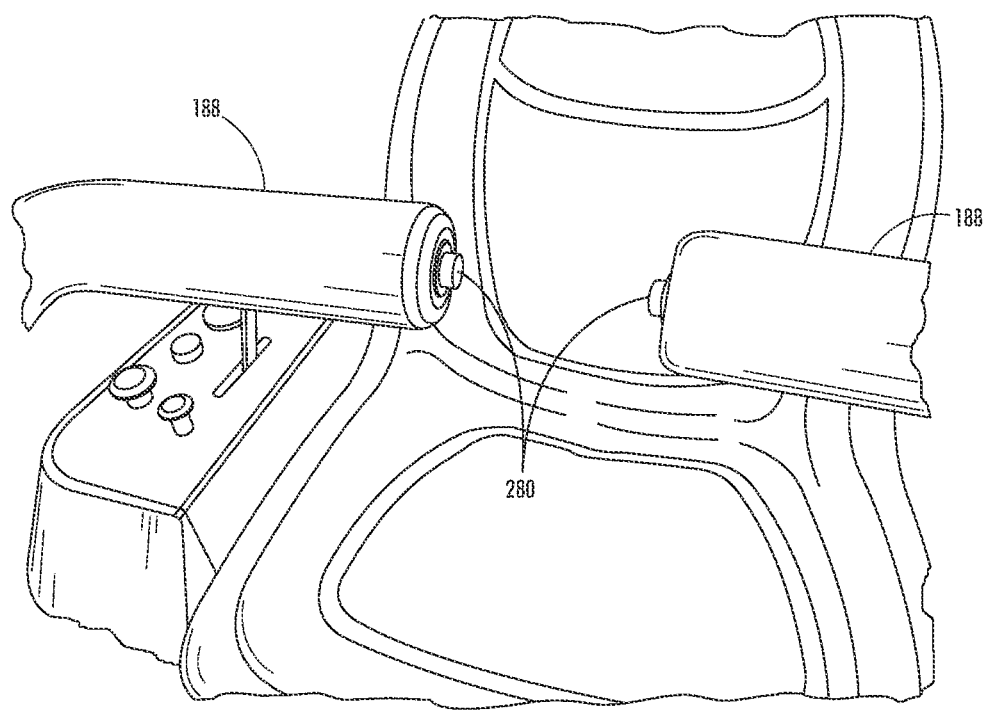
FIG. 20 is an illustration of an optional embodiment having buttons for optional, manual control of the system disclosed herein.

The schematic illustration of FIGS. 18A-C shows the air valve drive to either pair of valves. Contemplated herein is an override feature to manually energize either the right bias air valve pair 122 and 126 or the left bias air valve pair 124 and 128. The manual bias may be accomplished through the right and left steering lever buttons depicted in FIG. 17C. And, while depicted as buttons located on the steering levers 188 of the ZTR mower, it will be appreciated that alterative locations and switch types may be considered for the manual controls. This feature enables the operator to actuate either of two buttons 280 (FIG. 20), located on the steering levers, to produce a manual signal and thereby bias the front end of mower 100 when the supplied bias from cylinders 106 and 108 is idle (not at a sufficient angle to engage the system).

Considering that when the mower is going straight down a slope, the accelerometer will not sense any side angle and thus will not have any pressure going to the air cylinders. If the operator decides to suddenly turn back up the slope, the balancing or biasing force will not be on the casters instantly. This is due to a designed damping in the system that makes the system immune to the normal bumps and jiggles that a mower sees. To prevent the operator from having to wait for the system to turn on, the button switches 280 on the steering levers (or foot pedals or other easily accessed controls) are provided to allow the operator to manually tell the system he is about to turn up a hill to the left or right. The system then turns on a pressure of 40 PSI to the proper ports of the air cylinders to bias the casters in the direction determined by the button that is being depressed. The pressure is not great enough to force the casters to turn, but only to assist in a turn uphill. The mower can then be quickly turned uphill without tearing up the turf.

Figure 19:
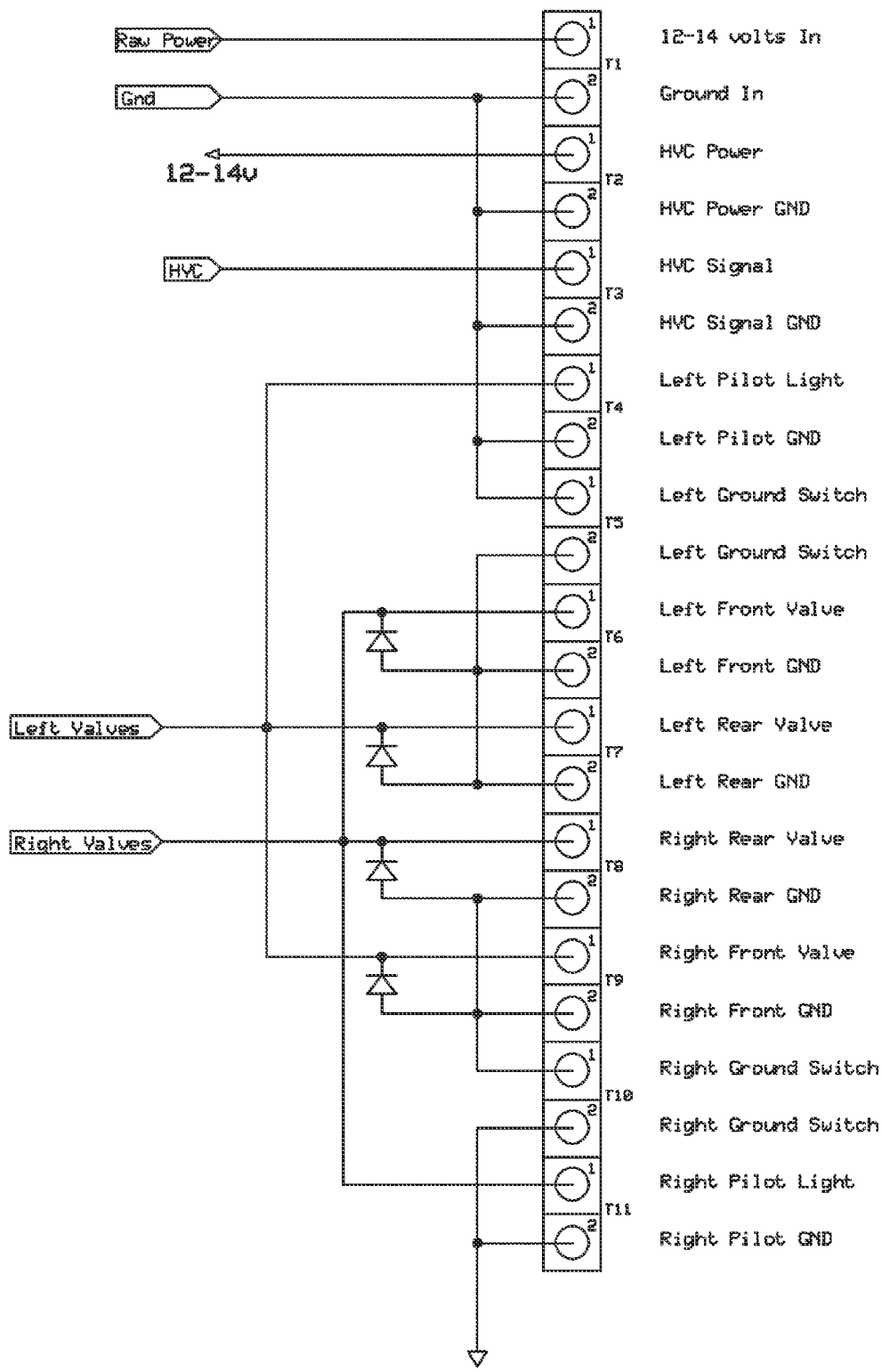

Lastly, FIG. 19 illustrates the pin out for controller printed circuit board 104 as seen in FIG. 14 for an analog control embodiment. It will be appreciated that in the digital control embodiment, the control board 104 would include a microprocessor or programmable gate array (244), and would have similar outputs.

Figure 21A:
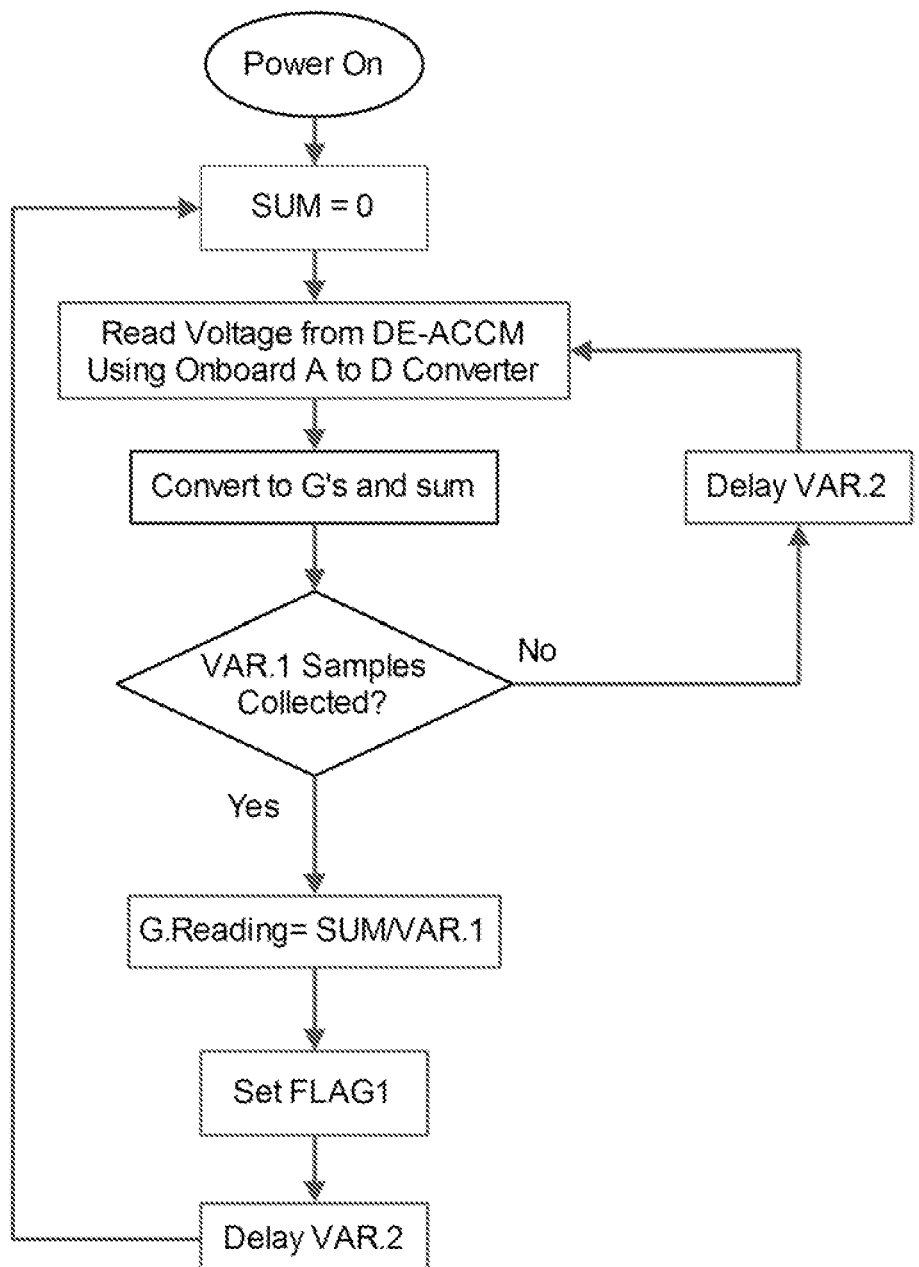
FIGS. 21A-C are flow charts illustrating the logic for a digital control system.
Figure 21B:
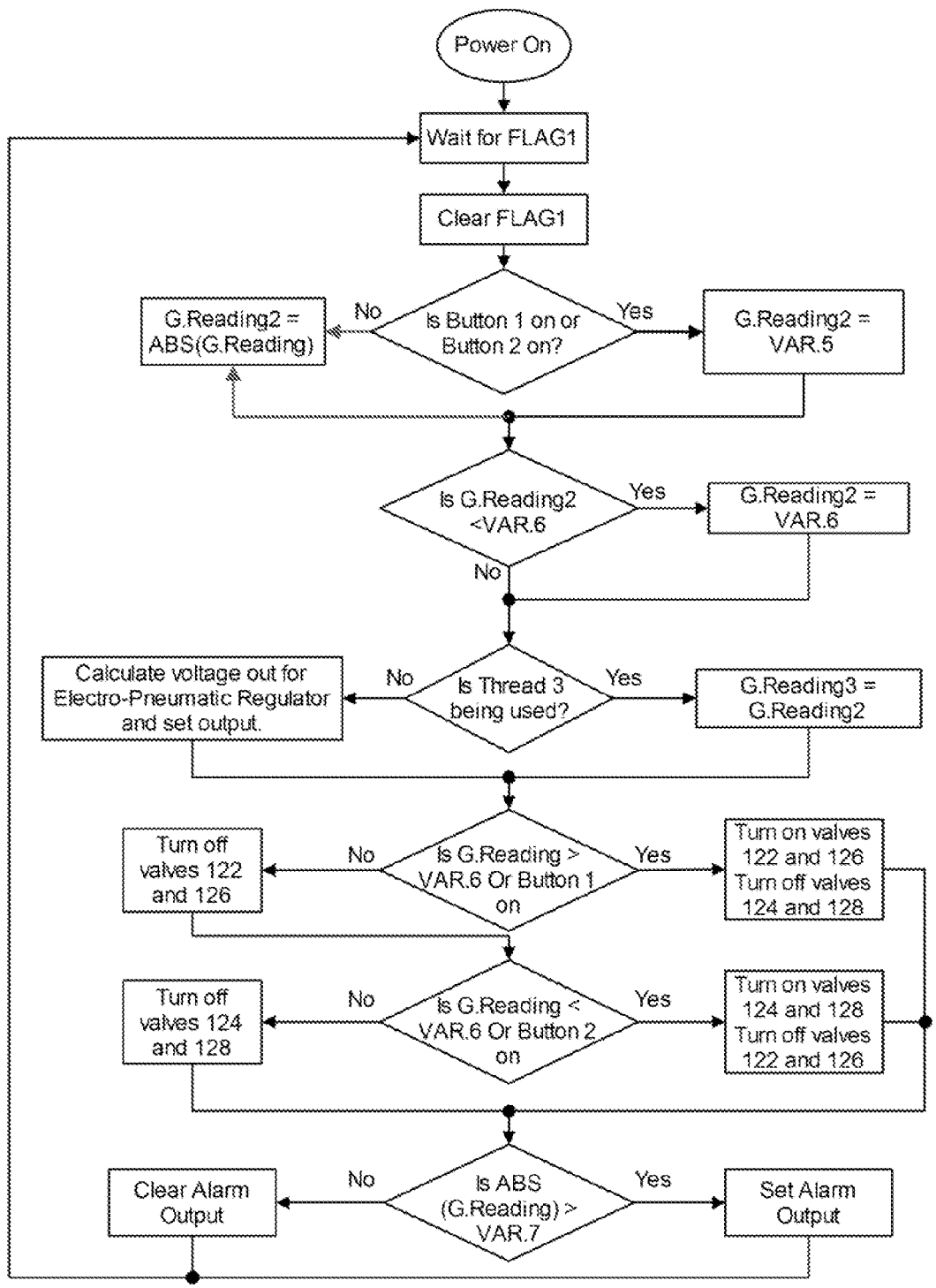
Figure 21C:
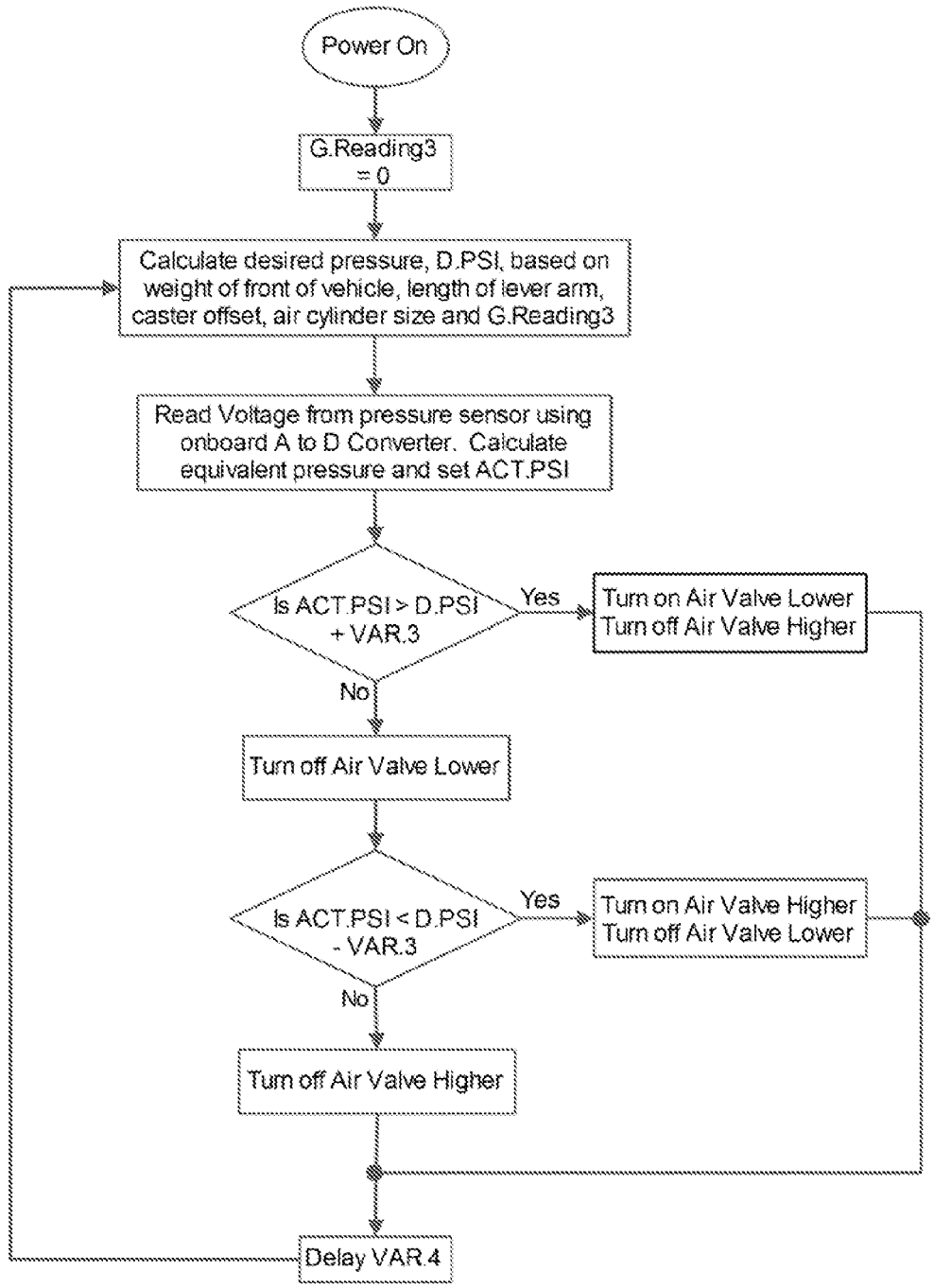

All of the functions of the analog control system can be incorporated into a digital control system using either a microprocessor or a programmable gate array. The analog controller has many potentiometers that must be set to give the correct output for a given type of ZTR vehicle. These potentiometers must be "tuned" on every controller made. With a digital system, all of the potentiometers are replaced by variables in the processor's program. The values of these variables only have to be determined once for any given type or model of ZTR vehicle, and then those values can be used each time a controller is made for that type of vehicle. This reduces cost in commercial applications. In addition to the functions described above for the analog controller, a digital controller can also incorporate other functions. The electro-pneumatic air pressure regulator, for example a regulator such as that disclosed in U.S. Pat. No. 4,901,758 to Cook et al., which is hereby incorporated by reference in its entirety, is a device that uses an electronic controller to produce a pneumatic output based on an electronic input. When using a digital control system, this function can easily be integrated into the program, thus saving the cost of buying a separate electro-pneumatic air pressure regulator. A series of flow charts describing the logic for these functions is shown in FIGS. 21A-C. This flow chart is for a processor having integral Analog to Digital and Digital to Analog converters, such as an Arduino Mini using an ATMEL ATMEGA328 processor.

The flow charts include variables to represent values that might change when designing a digital control system for different types of ZTR vehicles. These variables, their approximate values, and the use of other variables are listed in the following table:

| VARIABLE NAME | DESCRIPTION | APPROX. VALUE |
| --- | --- | --- |
| VAR.1 | Number of samples | 50 |
| VAR.2 | Delay before next sample | 0.005 seconds |
| VAR.3 | Pressure dead zone | 2.5 PSI |
| VAR4. | Delay before next pressure regulation cycle | 0.005 sec. |
| VAR.5 | Amount of G's to result in 40 PSI output | About 0.2 G |
| VAR.6 | Minimum output pressure | 10 PSI |
| VAR.7 | High limit G reading | 0.5 G |
| SUM | Accumulator for G readings | |
| G.Reading | Smoothed G reading | |
| G.Reading2 | G.Reading used in Thread 2 | |
| G.Reading3 | The G reading used by Thread 3 to calculate the desired pressure | |
| Flag1 | Flag used to tell Thread 2 that G.Reading is set | |
| D.PSI | Desired pressure | |
| ACT.PSI | Actual pressure as measured by sensor | |

FIG. 21A (Thread 1: Accelerometer Reading and Smoothing) shows the logic for reading the side G force on the ZTR vehicle. Note that the readings are averaged to smooth out the vibrations and bouncing that a ZTR mower would experience. FIG. 21B (Thread 2: Valve Control, Roll Over Limits and Steering Lever Buttons) shows the logic for controlling the air valves 136, the steering lever buttons 280 on levers 188, and the roll over limit alarm. FIG. 21C (Thread 3: Optional Electro-Pneumatic Regulator Function) shows the logic for replacing the electro-pneumatic air pressure regulator 118 with two small air valves and a pressure sensor. The two air valves are termed Air Valve Lower and Air Valve Higher. The first bleeds air from reservoir 134, while the second adds air to the reservoir. By continuously checking the actual pressure against the desired pressure and venting or adding air, the desired pressure can be maintained.

In recapitulation, the present embodiment, as generally depicted in FIGS. 2A and 2B, include an electro/pneumatic control system that provides the ability for a ZTR mower to travel in a straight path along a hillside, without crabbing and without tearing up the turf. Through the use of linear piston cylinders, that are driven by slope dependent air pressure, the casters are strongly encouraged to track as if the ZTR was being used on a level surface. Accelerometer 130 is the critical element in determining when and how much air pressure is required. Although depicted as an analog system, it is readily understood by those skilled in the art that a digital control system, using a microprocessor or programmable gate array, would equally provide the desired results of the present embodiment.

The following is a general summary of several of the features of the disclosed embodiments:

The Slope Traversing System uses an accelerometer to measure the force resulting from the side tilt of the mower. This force measurement is combined with the weight on the front casters of the particular type of machine to determine the rotational force that gravity will induce into the casters. Based on the diameter of the air cylinders, and the length of the lever arm the cylinders act through, an air pressure is calculated that exactly balances the induced rotational force. Thus, the mower remains neutral while traversing side slopes.

The system helps prevent rollover accidents by continuously monitoring the angle of the mower. For each type of machine, a maximum allowable angle is determined and the system, upon detecting that the mower is at or approaching the rollover angle, takes one of two actions: either remove the balancing torque such that the mower will then turn down the hill, or produce an alarm. In conjunction with the alarm the speed of the machine could be reduced to decrease the likelihood of a rollover.

A turn assist feature is easily integrated into the system. This is operator controlled and makes the system more responsive, especially when turning from level up a steep slope. The turn assist does not turn the casters, but provides a small assist to help turn uphill.

The system conserves air by using the small air reservoir connected to the air cylinders, and also by having an inactive area at very low angles. This keeps the air valves from turning on and off when they are not needed and prevents wasting of compressed air.

The system can be controlled by either analog or digital circuitry. In either case, an accelerometer or similar means of sensing inclination is used to determine the side angle of the mower and thereby the gravitational force acting on the front casters. However, a mower is used on rough terrain, which necessitates an averaging or damping of the signal from the accelerometer in order to get an accurate reading of the angle of the mower.

This system not only can be installed as a factory feature, but also can be retrofitted to existing machines as a dealer option. To facilitate installation in the field, a means to extend the spindles of the casters was developed (FIG. 6) so that the lever arms and cams can be attached without the need to replace the caster assembly.

It will be appreciated that several of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the description above and the following claims.

What is claimed is:

1. A zero turning radius vehicle, comprising:
    a frame having a power transmission operatively and independently engaged to each one of at least two driven wheels connected to the frame; and
    at least one caster rotatably connected to said frame and supporting a portion of the vehicle weight,
    said at least one caster being operatively biased in response to a device measuring proper acceleration perpendicular to a front-to-rear axis of the vehicle.

2. The vehicle according to claim 1, wherein said device measuring proper acceleration of the vehicle includes an accelerometer.

3. The vehicle according to claim 1, further comprising: a mower deck operatively connected to said frame.

4. The vehicle according to claim 1, wherein said at least one caster is biased by a pneumatic cylinder.

5. The vehicle according to claim 1, wherein said at least one caster is biased by at least one device selected from the group consisting of:
    a pneumatic motor;
    a fluid driven cylinder;
    a linear electric motor;
    an electric solenoid;
    a rotary electric motor;
    a pulley and cable drive; and
    a chain and sprocket drive.

6. The vehicle according to claim 1, wherein a vertical axis of said at least one caster further comprises a relative rotational position indicator.

7. The vehicle according to claim 6 wherein said relative position indicator includes a sensor selected from the group consisting of:
a cam and cam follower sensor;
a digital encoder;
a disk and associated through hole light sensor;
a reflective disk or optical mask and a light sensor;
a magnetic field sensor;
a proximity sensor; and
a chromatic disk and color sensor.

8. The vehicle according to claim 1 wherein said device measuring proper acceleration is included within a control system and said control system is further responsive to a maximum inclination value representing a predetermined safe angle of operation for the vehicle.

9. The vehicle according to claim 8 wherein a biasing force applied to said at least one caster is reduced upon reaching the safe angle of operation.

10. The vehicle according to claim 8 wherein a biasing force applied to said at least one caster is returned to zero upon reaching the safe angle of operation.

11. The vehicle according to claim 8 wherein an alarm is activated upon reaching a maximum safe angle of operation.

12. The vehicle according to claim 8 wherein the drive speed of said driven wheels is reduced upon reaching a maximum safe angle of operation.

13. The vehicle according to claim 1 wherein a biasing force is applied to said at least one caster in response to a manual signal.

14. The vehicle according to claim 1 wherein said at least one caster is operatively biased in response both to said device for measuring proper acceleration and to manual switches.

15. The vehicle according to claim 1 wherein said device measuring proper acceleration is part of an electronic subsystem; said electronic subsystem outputs a signal representative of the angle of the vehicle; and
the vehicle further includes a pneumatic subsystem responsive to the signal; said pneumatic subsystem providing a biasing force to said at least one caster.

16. The vehicle according to claim 15 wherein said pneumatic subsystem includes:
a source of compressed air;
at least one pneumatic cylinder operatively connected between the frame and said at least one caster;
an electro-pneumatic air pressure regulator to provide a regulated air pressure proportional to the signal; and
at least one valve controlling the application of the regulated air pressure to said at least one pneumatic cylinder to bias said at least one caster.

17. The vehicle according to claim 16, further including a pneumatic reservoir connected to said electro-pneumatic regulator and to said at least one pneumatic cylinder to conserve air pressure in the pneumatic subsystem.

18. The vehicle according to claim 1 wherein said device measuring proper acceleration is included within a control system; said control system further includes components for damping the signal from said device to enable reading the inclination of the vehicle.

19. The vehicle according to claim 18, wherein the components used for damping the signal from said device measuring proper acceleration include a variable resistor in series with a capacitor, whereby the amount of damping is controlled by varying the resistance of the variable resistor.

20. The vehicle according to claim 15, further including a digital control system comprising a digital logic device, said logic device receives input from said device measuring proper acceleration and executes logic operations necessary to operatively bias said at least one caster.

21. The vehicle according to claim 20, further including at least two valves and a pressure sensor, wherein the function of the electro-pneumatic pressure regulator is integrated into the digital control system by the logic device operating the values in response to the pressure sensor.

22. The vehicle according to claim 1, further including an analog control board to receive input from said device measuring proper acceleration and control the operation of an electrical and pneumatic subsystem to operatively bias said at least one caster.

23. The vehicle according to claim 1, wherein said caster is operatively connected to said frame with an internally threaded extension attached to the top of a kingpin, wherein said threaded extension enables the mounting of a control lever to said at least one caster,
said at least one caster being operatively biased, via said threaded extension, in response to the output of an accelerometer associated with the vehicle.

24. The vehicle according to claim 23, further including a set screw in said threaded extension, said set screw creating a binding force between the kingpin and the threaded extension, thereby locking the threaded extension in place relative to the kingpin.

25. The vehicle according to claim 1, wherein said device measuring proper acceleration of the vehicle includes an accelerometer, and said at least one caster is biased by a pneumatic cylinder, and where the accelerometer detects an angle of the vehicle while traversing a slope and in response produces a proportional signal that controls a pressure applied to at least one pneumatic cylinder operatively connected to the caster so that the bias force applied to the caster by the cylinder is proportional to the angle of the slope being traversed by the vehicle.

* * * * *